US012688709B2

(12) United States Patent (10) Patent No.: US 12,688,709 B2
Mori et al. (45) Date of Patent: Jul. 21, 2026

(54) RECOGNITION DEVICE, RECOGNITION METHOD, AND RECOGNITION PROGRAM

(71) Applicant: NTT, Inc.

(72) Inventors: Kohei Mori, Tokyo (JP); Kazuaki Obana, Tokyo (JP); Takahiro Hata, Tokyo (JP); Yuki Yokohata, Tokyo (JP); Aki Hayashi, Tokyo (JP)

(73) Assignee: NTT, Inc., Tokyo (JP)

( * ) Notice: Subject to any disclaimer, the term of this patent is extended or adjusted under 35 U.S.C. 154(b) by 202 days.

(21) Appl. No.: 18/566,154

(22) PCT Filed: Jun. 8, 2021

(86) PCT No.: PCT/JP2021/021778
§ 371 (c)(1),
(2) Date: Dec. 1, 2023

(87) PCT Pub. No.: WO2022/259373
PCT Pub. Date: Dec. 15, 2022

(65) Prior Publication Data
US 2024/0273921 A1 Aug. 15, 2024

(51) Int. Cl.
*G06K 9/00* (2022.01)
*G06T 7/00* (2017.01)
*G06V 10/764* (2022.01)
*G06V 20/56* (2022.01)

(52) U.S. Cl.
CPC ............ *G06V 20/588* (2022.01); *G06T 7/001* (2013.01); *G06V 10/764* (2022.01); *G06T 2207/30256* (2013.01)

(58) Field of Classification Search
CPC .... G06V 20/588; G06V 10/764; G06T 7/001;
G06T 2207/30256; G06T 2207/10016;
G06T 7/11; G06T 7/174; B60W 40/06;
G08G 1/00
USPC ................................................ 382/103, 104
See application file for complete search history.

(56) References Cited

U.S. PATENT DOCUMENTS

| | | | |
|---|---|---|---|
| 2002/0061123 A1 * | 5/2002 | Akutagawa | ............... G06T 7/73 |
| | | | 382/104 |
| 2013/0051680 A1 | 2/2013 | Takashi et al. | |
| 2015/0071490 A1 * | 3/2015 | Fukata | ................... G08G 1/165 |
| | | | 382/103 |
| 2015/0227800 A1 | 8/2015 | Takemae | |

(Continued)

FOREIGN PATENT DOCUMENTS

| | | |
|---|---|---|
| JP | 2008262333 A | 10/2008 |
| JP | 2013051987 A | 3/2013 |
| JP | 2015149028 A | 8/2015 |

(Continued)

*Primary Examiner* — Duy M Dang

(57) ABSTRACT

A recognition device that detects a boundary of a roadway by use of time-series images captured by a camera mounted on a vehicle, the recognition device including: an acquisition unit that acquires the time-series images; and a detection unit that classifies areas in the acquired time-series images into a roadway, which is an area having a small change amount, and a portion other than the roadway, which is an area having a large change amount, according to magnitude of the change amounts, and detects a boundary between the area having the small change amount and the area having the large change amount as a boundary of the roadway.

7 Claims, 27 Drawing Sheets

(56)　　　　　　　References Cited

U.S. PATENT DOCUMENTS

2022/0229168　A1　　7/2022　Kondo et al.

FOREIGN PATENT DOCUMENTS

| JP | 2019096151 | A | 6/2019 |
| JP | 2020113207 | A | 7/2020 |
| JP | 2021060371 | A | 4/2021 |

* cited by examiner

L1

L2

L3

L4

L5

L6

TIME t

TIME t+1

TIME t+2

Fig. 10

BINARIZATION

EMPHASIZE CHANGE AT t+1 t t+1 t+2

RECOGNITION DEVICE, RECOGNITION METHOD, AND RECOGNITION PROGRAM

CROSS-REFERENCE TO RELATED APPLICATIONS

This application is a U.S. 371 Application of International Patent Application No. PCT/JP2021/021778, filed on 8 Jun. 2021, the disclosure of which is hereby incorporated herein by reference in its entirety.

TECHNICAL FIELD

The disclosed technique relates to a recognition device, a recognition method, and a recognition program.

BACKGROUND ART

In order to implement a function related to automatic driving or driver assistance, it is necessary to provide a function for appropriately recognizing the surrounding environment of an automobile, and controlling the vehicle or making a notification or a suggestion to a driver on the basis of the recognition result. For such a function, an image captured by a camera or the like mounted on an automobile may be used to recognize the surrounding environment of the automobile.

In the case of using an image, for example, binarizing a simplified image makes it possible to a specific pattern (see, for example, Patent Literature 1).

CITATION LIST

Patent Literature

Patent Literature 1: JP 2019-96151 A

SUMMARY OF INVENTION

Technical Problem

As a surrounding environment to be recognized by an automobile, there is a boundary with a roadway or a sidewalk or the like, and the boundary has various patterns such as a straight line, a dotted line, and a combination thereof. However, there are cases where a boundary cannot be patterned. Examples of the cases include various division lines whose colors, shapes, or the like cannot be patterned, a case where there is no division line, an influence of a shadow of a feature or the like, deterioration of a division line with the lapse of time, and an influence of another automobile. Note that a boundary of a roadway includes a boundary between traveling lanes and a boundary between the roadway and a portion other than the roadway (sidewalk).

The disclosed technique has been made in view of the above points, and an object thereof is to provide a recognition device, a recognition method, and a recognition program capable of appropriately recognizing the surrounding environment of a traveling vehicle.

Solution to Problem

An aspect of the present disclosure is a recognition device that detects a boundary of a roadway by use of time-series images captured by a camera mounted on a vehicle, and the recognition device includes: an acquisition unit that acquires the time-series images; and a detection unit that classifies areas in the acquired time-series images into a roadway, which is an area having a small change amount, and a portion other than the roadway, which is an area having a large change amount, according to magnitude of the change amounts, and detects a boundary between the area having the small change amount and the area having the large change amount as a boundary of the roadway.

Advantageous Effects of Invention

According to the disclosed technique, it is possible to appropriately recognize the surrounding environment of a traveling vehicle.

BRIEF DESCRIPTION OF DRAWINGS

FIG. 2 is a diagram illustrating examples of a case where a boundary cannot be patterned due to color arrangement or the like.

FIG. 10 is a diagram illustrating an example of calculation of a difference image.

DESCRIPTION OF EMBODIMENTS

Figure 1:
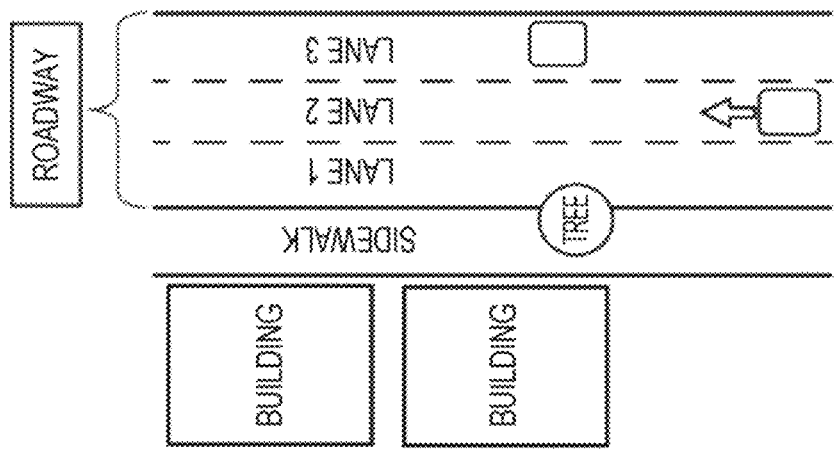
FIG. 1 is a diagram schematically illustrating a means for recognizing a surrounding environment shown in a drive recorder of a vehicle to be observed.

Hereinafter, an example of an embodiment of the disclosed technique will be described with reference to the drawings. Note that, in the drawings, the same or equivalent components and portions are denoted by the same reference signs. In addition, dimensional ratios in the drawings are exaggerated for convenience of description, and may be different from actual ratios.

First, an outline of the present disclosure will be described. The technique of the present disclosure can be applied to a means for recognizing a surrounding environment shown in a drive recorder of a vehicle to be observed as illustrated in FIG. 1. The surrounding environment can be recognized by classification of objects around the vehicle into objects that appear to be relatively moving and objects that do not appear to be moving, and detection of a division line of a traveling lane and a boundary between a roadway and a sidewalk.

Figure 2:
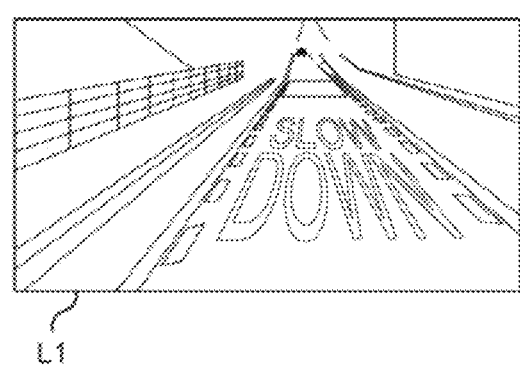
Figure 2:
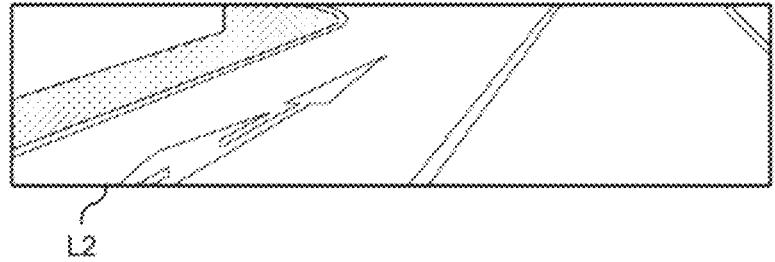
Figure 2:
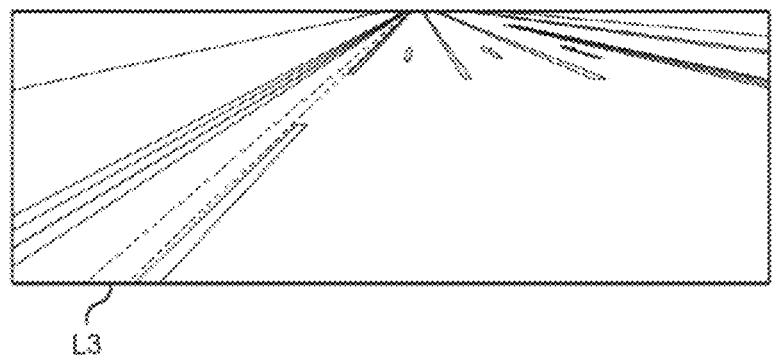
Figure 2:
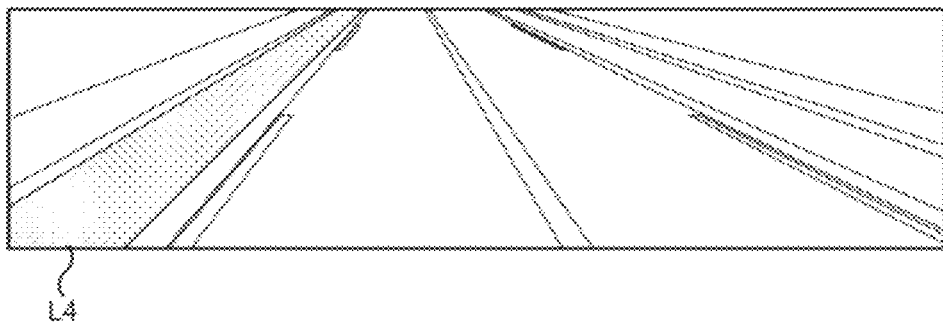

As described in the above problem, there are cases where a boundary cannot be patterned. Examples of a case where a division line cannot be patterned include a case where the color of the division line is not limited to white or orange, which is general, and a case where the shape of the division line is other than a simple solid line or a broken line, such as a division line for decelerating. FIG. 2 is a diagram illustrating examples of a division line that cannot be patterned. L1 in FIG. 2 illustrates a case where characters are drawn on a road and patterns of a plurality of division lines are included. L2 to L4 illustrate cases where division lines having a plurality of colors such as a white line, a blue line, and a green line are mixed. Furthermore, L4 includes an area of a bicycle dedicated lane, and it is difficult to determine the range of the roadway. In these cases, it is difficult to pattern and recognize a boundary.

Figure 3:
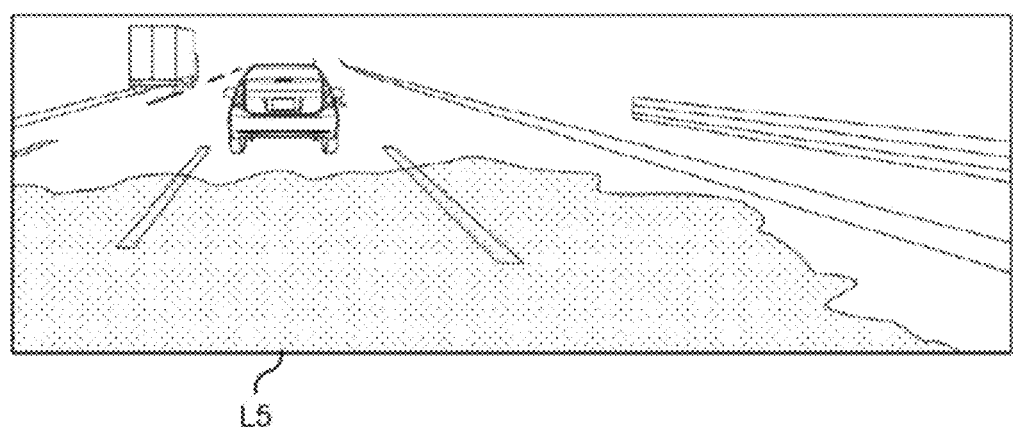
FIG. 3 is a diagram illustrating examples of a case where a boundary cannot be patterned due to an influence of a shadow and absence of a division line.
Figure 3:
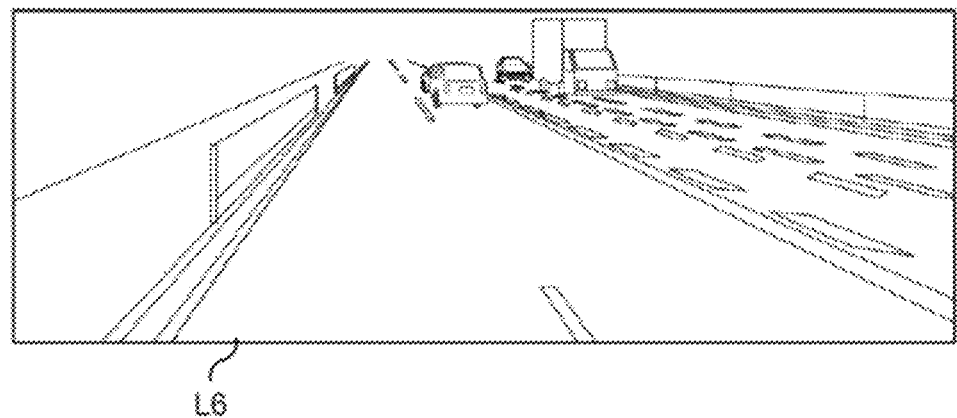

L5 in FIG. 3 is a diagram illustrating an example of a case where there is no division line and there is an influence of a shadow. A "white" division line does not always appear in the same color under the influence of sunshine conditions and shadows. Furthermore, in a case where a "white" division line is set as a detection condition, a guardrail also corresponds to this condition, and thus, may be detected as a boundary, which may lead to erroneous detection. L6 illustrates a scene where there is no division line at a boundary between a roadway and a sidewalk, and the boundary between the roadway and the sidewalk is a block and is not a division line.

Figure 4:
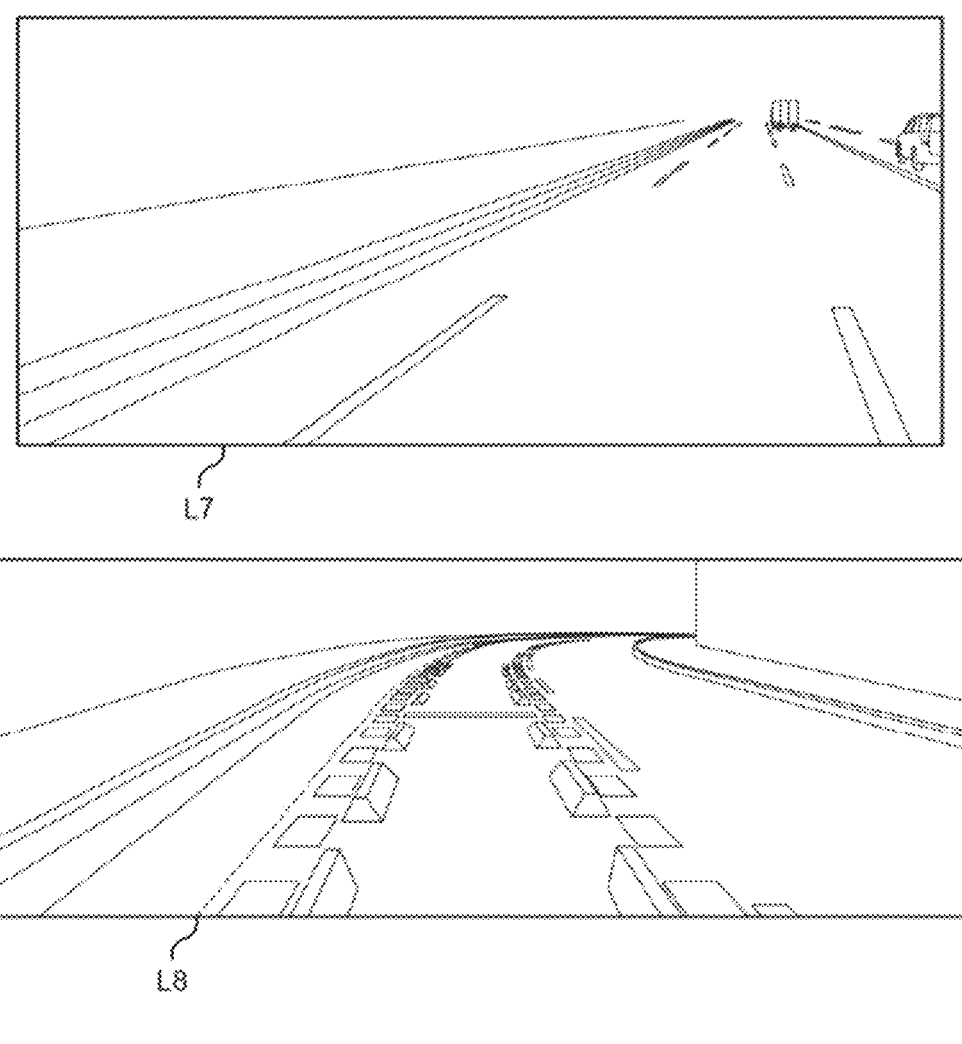
FIG. 4 is a diagram illustrating examples of a case where a boundary cannot be patterned even if there is a division line.
Figure 4:
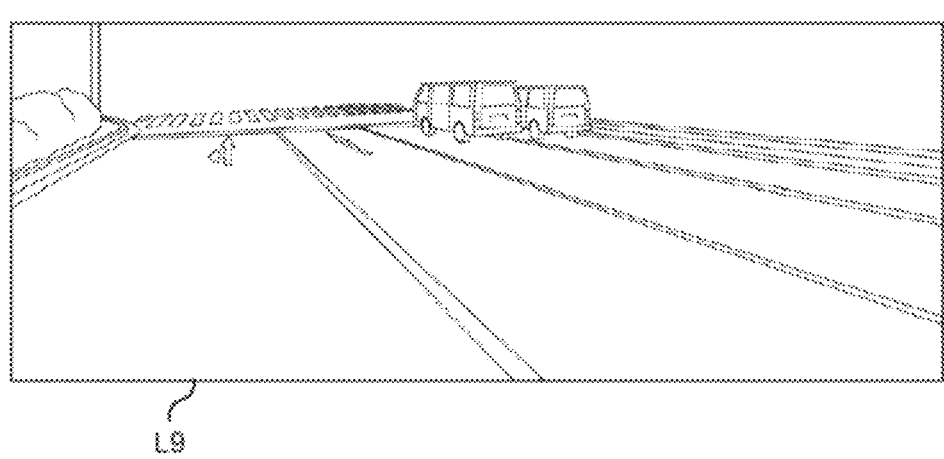

In addition, there is also a case where a boundary cannot be patterned even if there is a division line. FIG. 4 is a diagram illustrating examples of a division line that cannot be patterned. In L7 in FIG. 4, although the division lines are broken lines, there is less than one lane between one of the broken lines and the block, and thus it is difficult to specify for what the area is. L8 illustrates a division line that has faded due to deterioration with the lapse of time. In the case of two or more lanes, it is considered that left and right lines are usually broken lines, but L9 illustrates a case where, for example, lines before an intersection are solid lines even in the case of two or more lanes.

In view of the above situations, it is desired to detect a division line without any problem regardless of the color of the division line or the presence or absence of a shadow even in a case where it is difficult to recognize the division line. In addition to a division line, it is also desired to detect a boundary between a roadway and a sidewalk. Therefore, in the technique of the present disclosure, changing surroundings are captured, so that a boundary is recognized. For example, in a case where the color cannot be patterned or the shape cannot be patterned, it is assumed that a change observed in time-series images is less than that in a background because the characteristics as a whole are similar even if the color or the shape thereof cannot be patterned. Furthermore, in a case where the appearance of images changes with time due to the influence of a shadow or the like, the relationship between a background having a large change and a roadway having a small change does not change although the tendency of the entire time-series images changes (however, the change amount decreases as a whole, and thus it is necessary to lower a threshold value). As described above, assuming that an area having a relatively large change is a periphery makes it possible to grasp a surrounding environment. According to the present technique, it is possible to recognize the surrounding environment of a subject vehicle and to estimate a traveling lane of the subject vehicle, a peripheral lane, and a boundary between a roadway and a sidewalk regardless of the presence or absence of a division line. Note that, in the following, a case where the present technique is applied to a roadway will be described as an example, but the present technique can be applied to an area of a real space having a predetermined characteristic and other areas. The area of the real space having a predetermined characteristic is an area in which a plurality of patterns are continuous or similar patterns are continuous, and a proportion occupied by characteristics that do not apply to the patterns is small. Therefore, the present technique may be applied to a railroad or the like.

Figure 5:
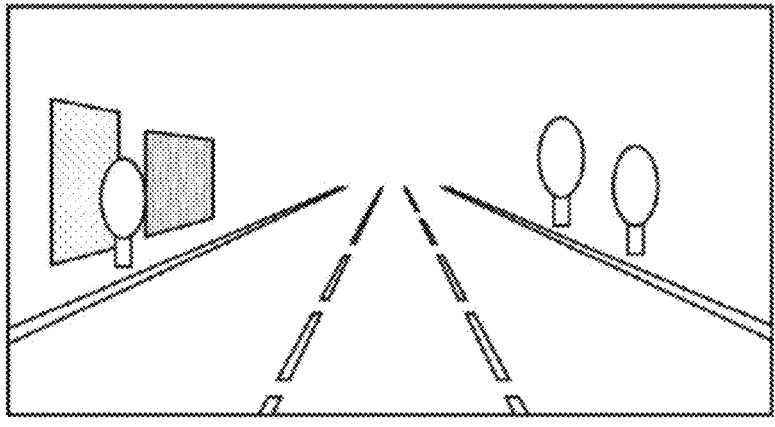
FIG. 5 is a diagram illustrating an example of time-series images captured by an in-vehicle camera.
Figure 5:
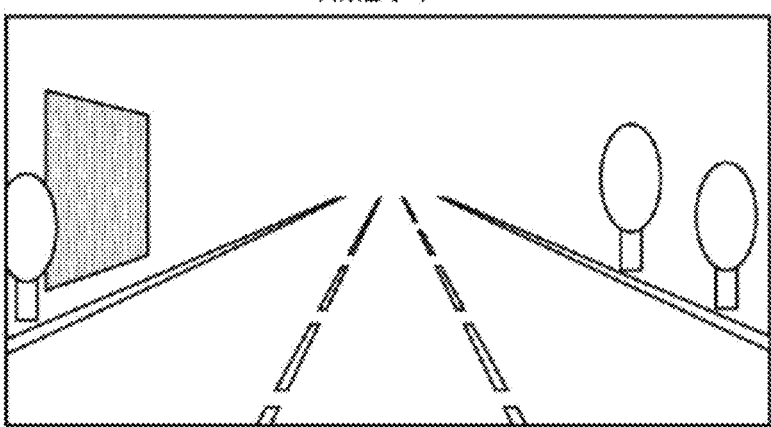
Figure 5:
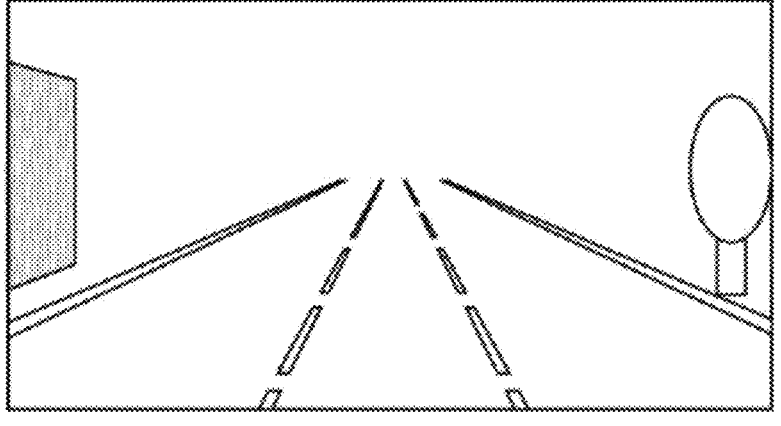

FIG. 5 is a diagram illustrating an example of time-series images captured by an in-vehicle camera. From the time-series images at the time illustrated in FIG. 5, a logic consisting of the following (1) to (6) can be described.

(1) A subject vehicle moves.

(2) With an in-vehicle camera of the subject vehicle, not the subject vehicle but the "surroundings" appear to be moving.

(3) In the "surroundings", a roadway is made of the same material such as concrete and is continuously constructed for a certain section, close colors appear continuously in the roadway, and thus the hue of the roadway is less likely to change.

(4) A curbstone block, a sidewalk, or a group of buildings varies in hue as compared with the roadway, and thus the hue thereof tends to change.

(5) Therefore, it is understood that an area having a relatively large change is a periphery and is not the roadway.

(6) It is possible to recognize a surrounding environment from the magnitude of a change in time series in pixels of the same coordinates or in the same area of images.

Hereinafter, a configuration of the present embodiment will be described.

Figure 6:
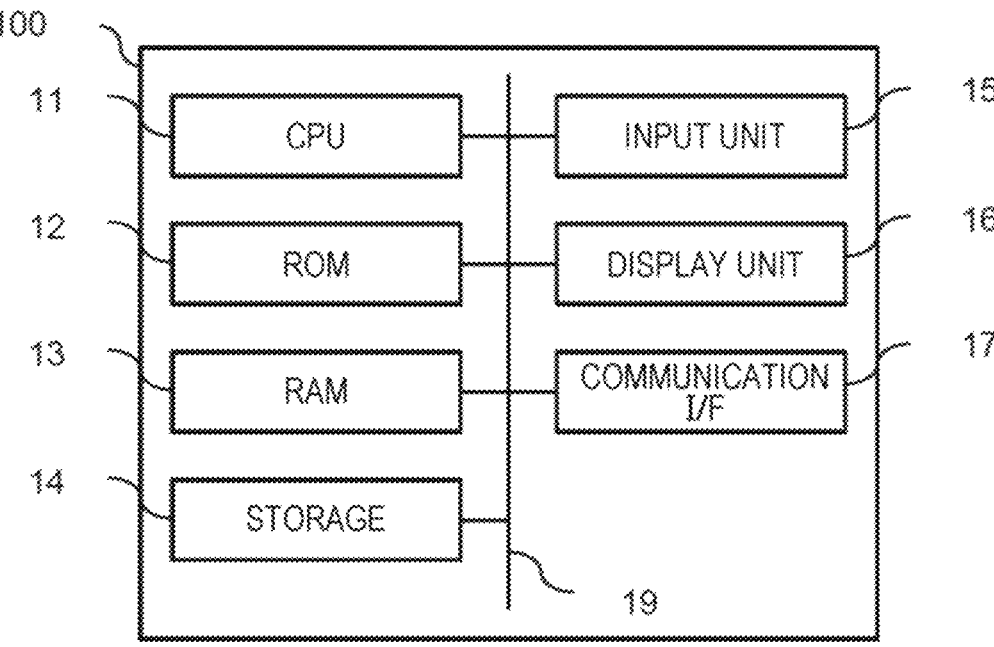
FIG. 6 is a block diagram illustrating a hardware configuration of a recognition device of the present disclosure.

FIG. 6 is a block diagram illustrating a hardware configuration of a recognition device 100 of the present disclosure.

As illustrated in FIG. 6, the recognition device 100 includes a central processing unit (CPU) 11, a read only memory (ROM) 12, a random access memory (RAM) 13, a storage 14, an input unit 15, a display unit 16, and a communication interface (I/F) 17. The components are communicably connected to each other via a bus 19.

The CPU 11 is a central processing unit, executes various programs, and controls each unit. That is, the CPU 11 reads a program from the ROM 12 or the storage 14 and executes the program using the RAM 13 as a working area. The CPU 11 controls each component described above and performs various types of calculation processing according to the program stored in the ROM 12 or the storage 14. In the present embodiment, a recognition program is stored in the ROM 12 or the storage 14.

The ROM 12 stores various programs and various data. The RAM 13 as a working area temporarily stores programs or data. The storage 14 includes a storage device such as a hard disk drive (HDD) or a solid state drive (SSD), and stores various programs including an operating system and various data.

The input unit 15 includes a pointing device such as a mouse and a keyboard, and is used to perform various inputs.

The display unit 16 is, for example, a liquid crystal display, and displays various types of information. The display unit 16 may function as the input unit 15 by adopting a touch panel system.

The communication interface 17 is an interface for communicating with another device such as a terminal. For the communication, for example, a wired communication standard such as Ethernet (registered trademark) or FDDI, or a wireless communication standard such as 4G, 5G, or Wi-Fi (registered trademark) is used.

Figure 7:
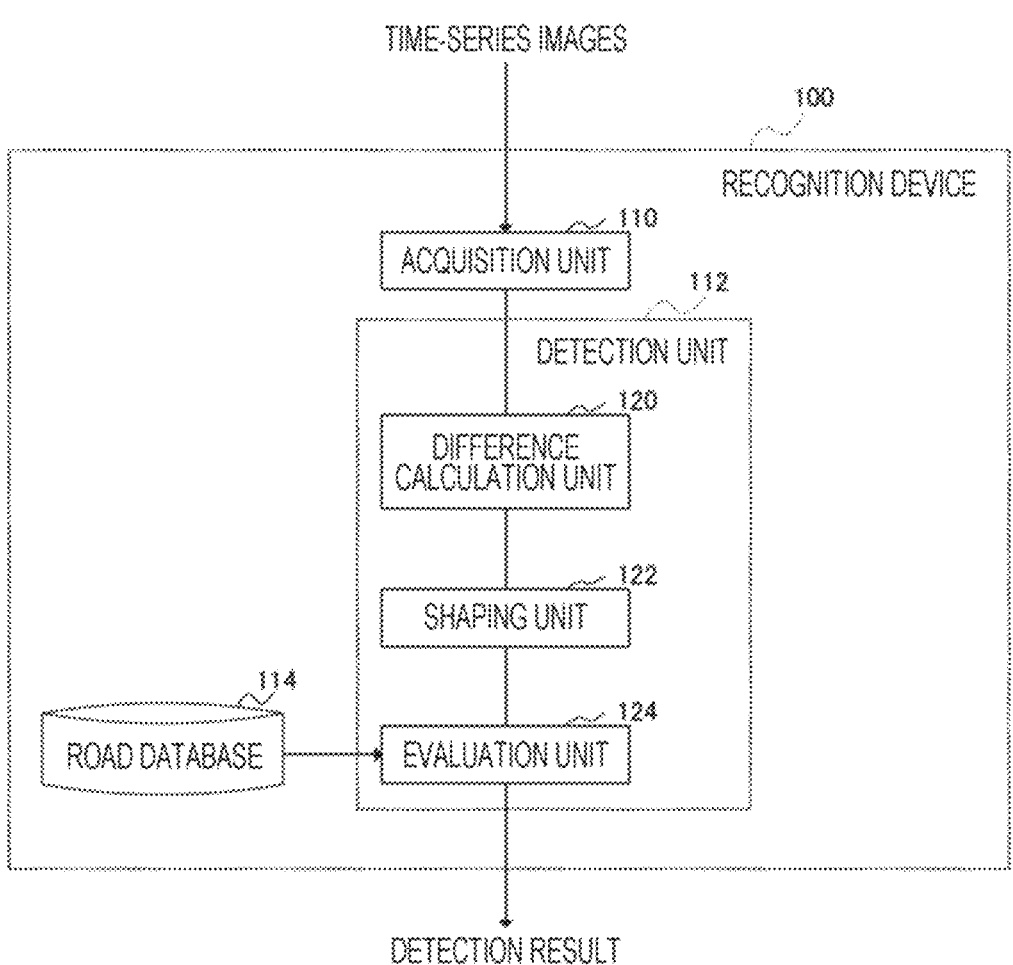
FIG. 7 is a block diagram illustrating a functional configuration of the recognition device of the present disclosure.

Next, each functional unit of the recognition device 100 will be described. FIG. 7 is a block diagram illustrating a functional configuration of the recognition device 100 of the present disclosure. Each functional unit is implemented by the CPU 11 reading the recognition program stored in the ROM 12 or the storage 14, developing the recognition program in the RAM 13, and executing the recognition program.

Figure 8:
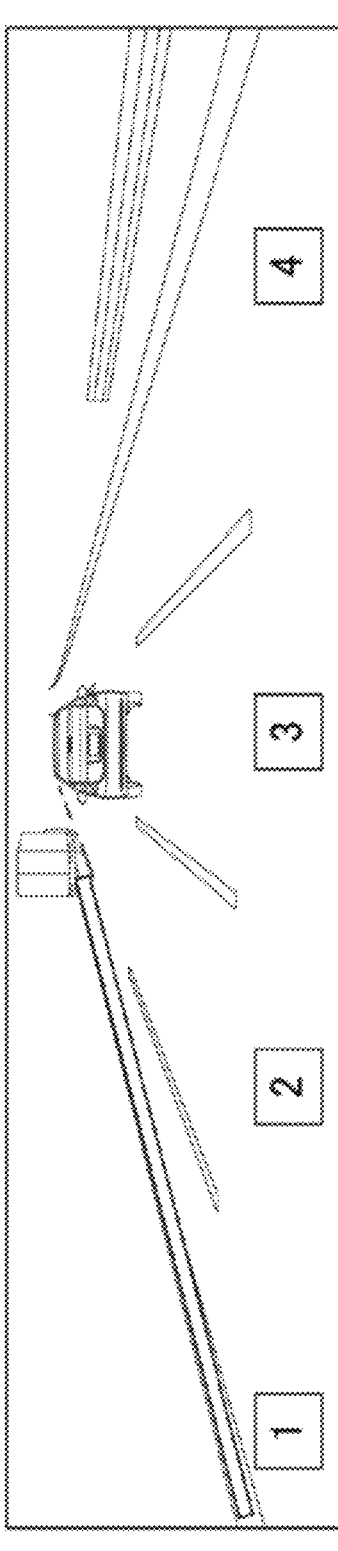
FIG. 8 is a diagram in which information on the number of lanes in road information is applied to an image.

As illustrated in FIG. 7, the recognition device 100 includes an acquisition unit 110, a detection unit 112, and a road database 114. The recognition device 100 uses the acquisition unit 110 to acquire time-series images captured by a camera mounted on a vehicle. The detection unit 112 is a processing unit that detects a boundary in the surrounding environment of the vehicle to be observed (hereinafter, simply referred to as the vehicle) and outputs the detection result, and is divided into a difference calculation unit 120, a shaping unit 122, and an evaluation unit 124 as functional units. The road database 114 stores road information including the number of lanes of a roadway. As illustrated in FIG. 8, applying information on the number of lanes in the road information to an image makes it possible to specify which lane is a lane of the subject vehicle.

The detection unit 112 classifies areas in the time-series images acquired by the acquisition unit 110 according to the magnitude of change amounts, and detects a boundary of the roadway. The areas are classified into a roadway, which is an area having a small change amount, and a portion other than the roadway, which is an area having a large change amount, so that a boundary between the area having the small change amount and the area having the large change amount is detected as a boundary of the roadway. Processing of each unit in the detection unit 112 will be described.

Figure 9:
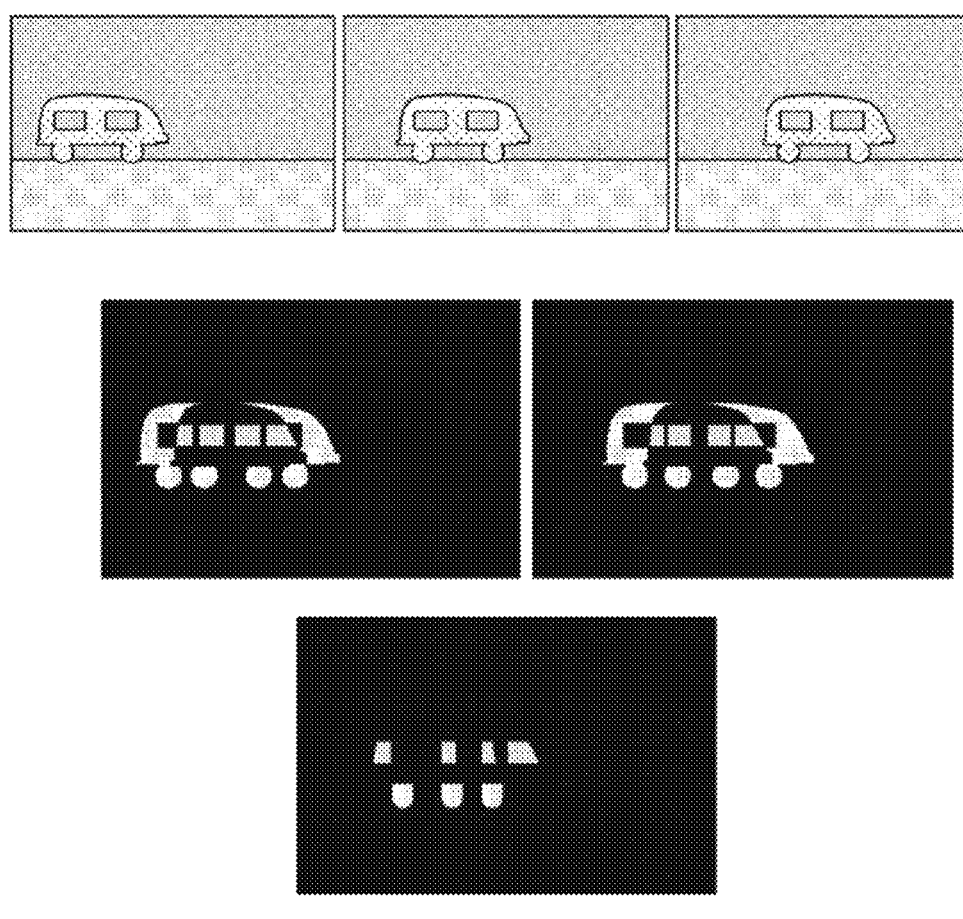
FIG. 9 is a conceptual diagram of a difference method.

The difference calculation unit 120 calculates a difference image of the time-series images. For the calculation of a difference image, a frame difference method (hereinafter, the difference method) is used. FIG. 9 is a conceptual diagram of the difference method. The difference method is a method of detecting a "changed pixel" by calculating a logical product from a calculation result of an absolute difference value between frames. The difference method is applicable to a method of detecting a surrounding environment with a camera fixedly installed on a moving body.

Figure 10:
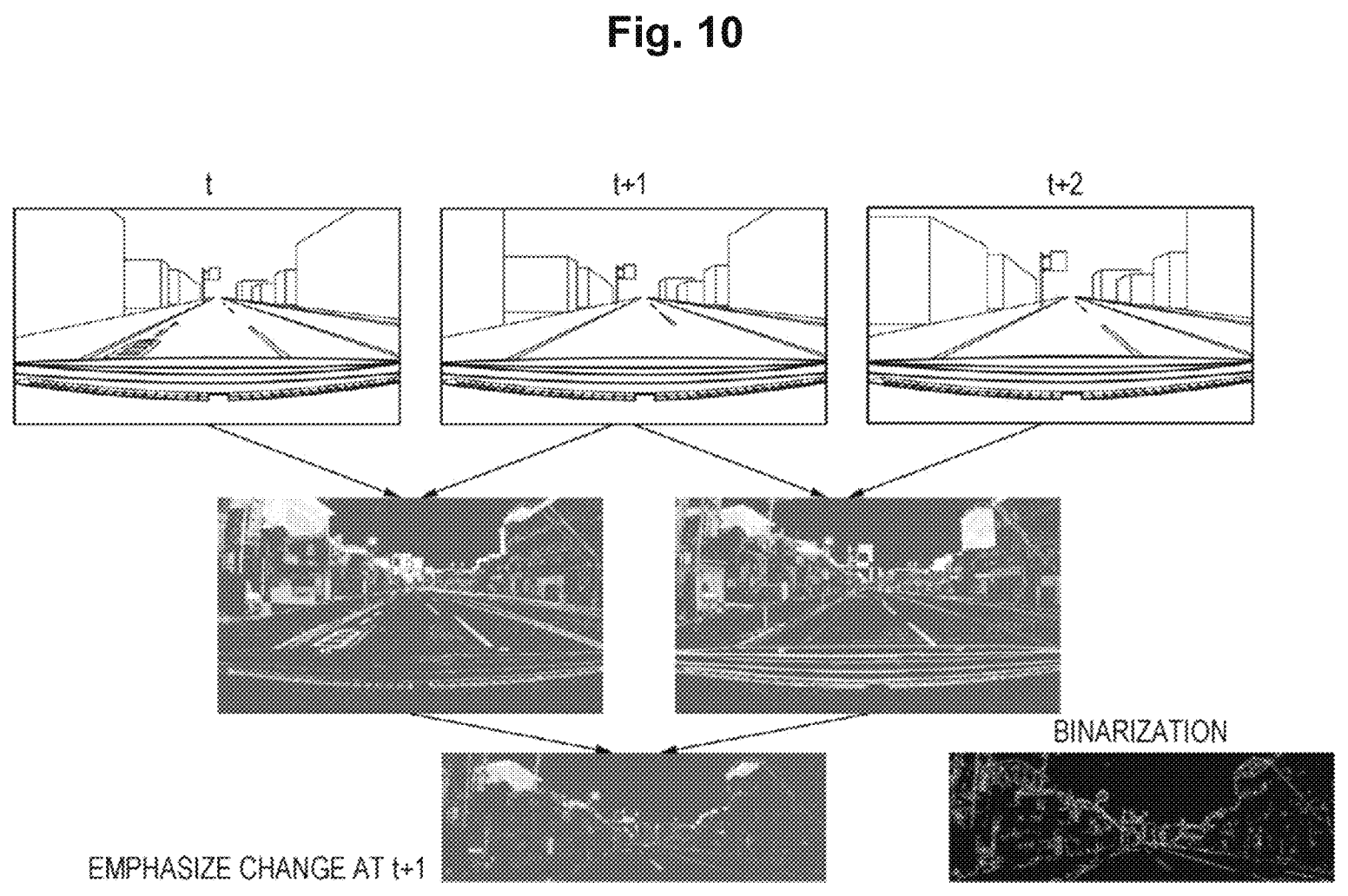

FIG. 10 is a diagram illustrating an example of calculation of a difference image. On the basis of time-series images including an image at t, an image at t+1, and an image at t+2, binarization to emphasize a change at t+1 is performed, so that a difference image is calculated. This method can be said to be a method focusing on the point that the color of a roadway does not change due to the property that the color of a concrete road looks basically the same except for construction traces and the like.

Figure 11:
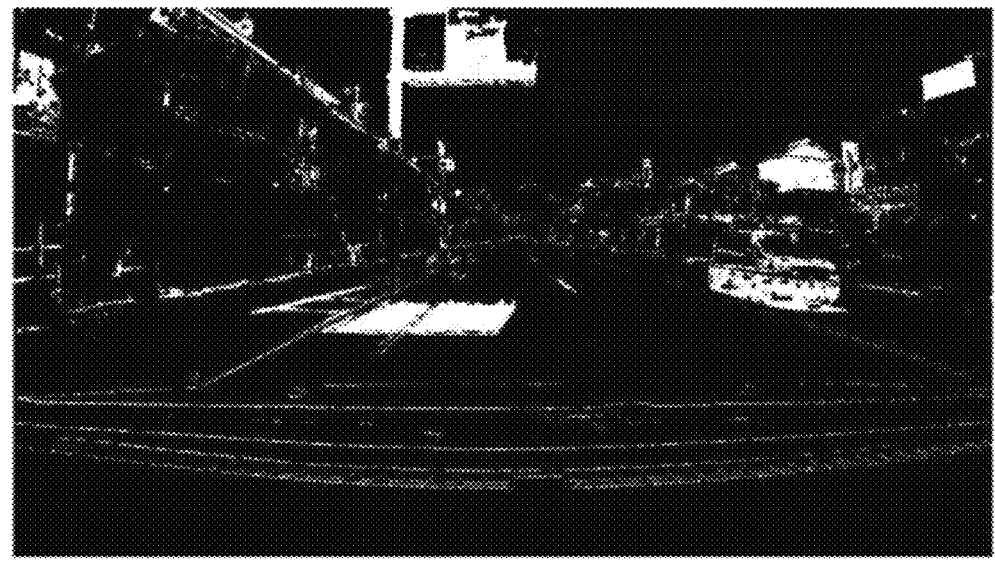
FIG. 11 is a diagram illustrating an example of a difference image calculated by emphasis on boundary lines.
Figure 11:
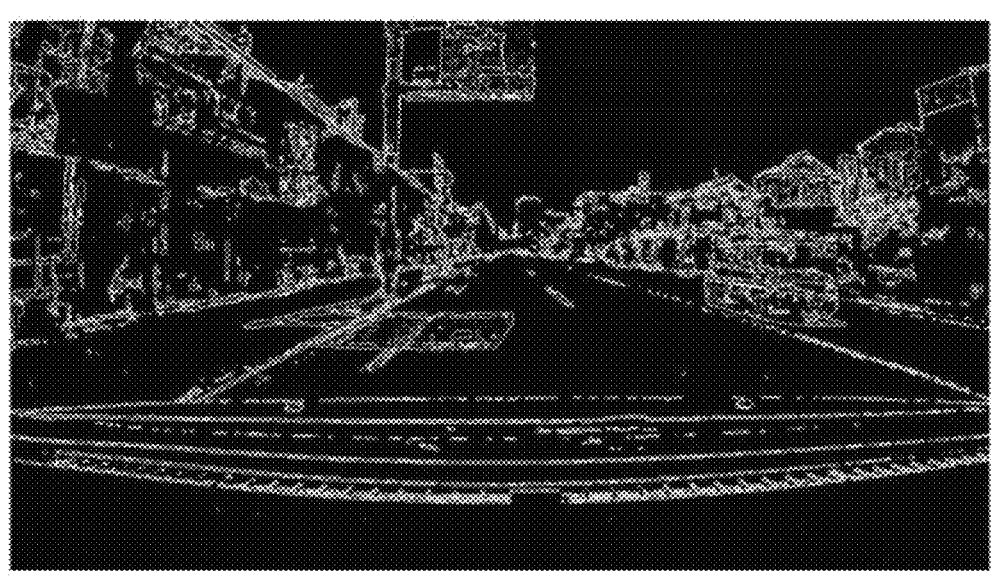

Furthermore, a difference image in which boundary lines are emphasized may be calculated by use of an adaptive threshold method. FIG. 11 is a diagram illustrating an example of a difference image calculated by emphasis on boundary lines. The upper part of FIG. 11 illustrates a difference image in a case where the entire image is binarized with the same threshold value according to the normal frame difference method. In this case, a dark color such as a colored division line disappears, and a temporarily dark place such as a "shade" is detected. Meanwhile, the lower part of FIG. 11 illustrates a difference image calculated by emphasis on boundary lines. Since boundary lines are emphasized in this method, only contour information is needed to detect a shaded area, and a colored division line can also be detected. In the case of a division line that is truly uniformly painted, information on only the contour is detected, but in reality, a difference is detected in the division line because there is a recess, a protrusion, paint peeling, or the like on the road surface.

Figure 12:
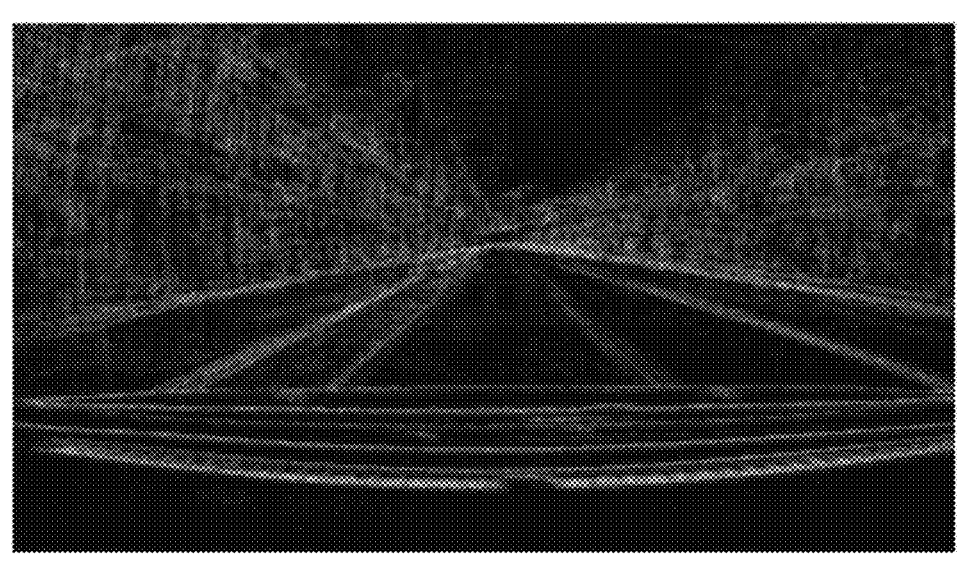
FIG. 12 is a difference image in which obtained frame difference images are superimposed in a certain time width range.

FIG. 12 is a difference image in which obtained frame difference images are superimposed in a certain time width range.

The shaping unit 122 corrects the difference image calculated by the difference calculation unit 120. As a correction method, a method suitable for each difference image is used as described below.

Figure 13:
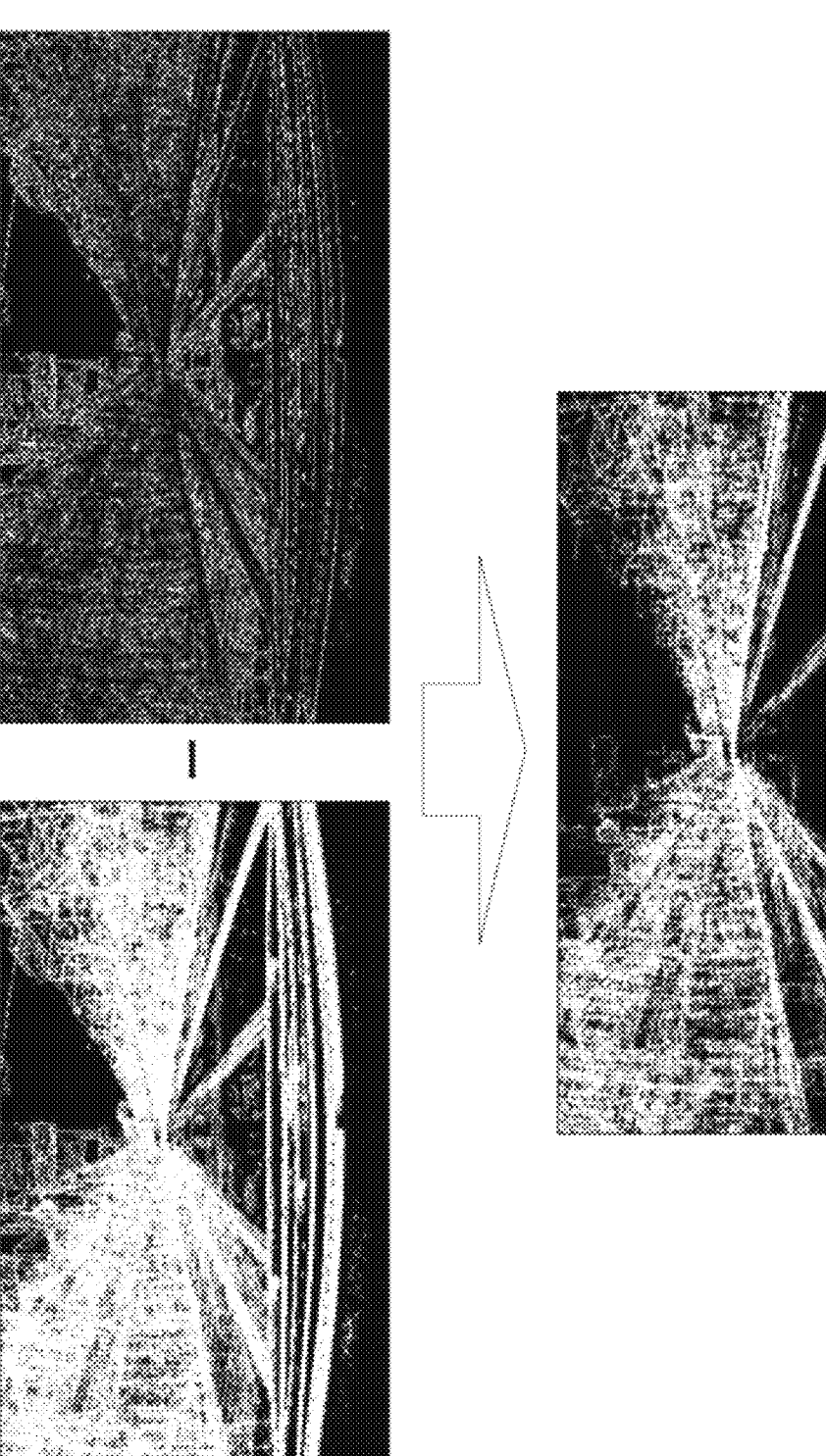
FIG. 13 is a diagram illustrating an example of correction to cut back pixels having a low frequency in consideration of the appearance frequency.

As an example of the correction, correction to cut back pixels having a low frequency in consideration of the appearance frequency will be described. FIG. 13 illustrates an example of correction to cut back pixels having a low frequency in consideration of the appearance frequency. In the difference image in the upper left part of FIG. 13, pixels having a low frequency that are locally present on the roadway and the sidewalks, such as a manhole and a shade, are removed. Furthermore, an object that is on the roadway but rarely appears and is detected as a large change is also removed. In this case, pixels corresponding to a division line, a building, and the like that frequently change due to the influence of a protrusion, a recess, or slight shaking of the traveling subject vehicle to left and right remain without being removed.

Figure 14:
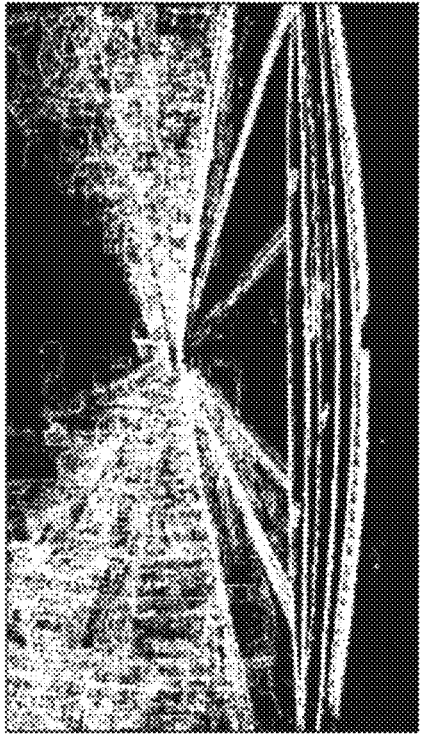
FIG. 14 is a diagram illustrating an example of correction to cut back pixels having a low frequency in consideration of the appearance frequency.
Figure 14:
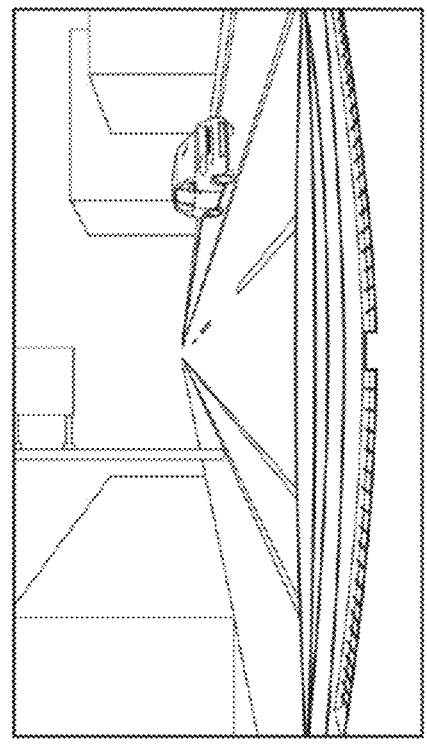

In the case of the image illustrated on the left side of FIG. 14, the boundary lines between the roadway and the sidewalks can also be extracted from changes in color of the road shoulder and the step block. In the difference image illustrated on the right side of FIG. 14, information on an instantaneous shade or a passing vehicle is reduced. The vehicle can be further reduced by processing being applied to a rectangular area detected by object detection.

In addition, in a case where a feature itself includes different colors or features and elements between the features include different colors as in the case of features in a surrounding environment, such as posts of a guardrail, poles, and plants, a boundary between a roadway and a sidewalk is further emphasized. For example, although a guardrail itself has a single color, a sidewalk or a building as a background is naturally shown between posts of the guardrail because the guardrail is installed by the posts. Thus, a boundary between a roadway and the sidewalk changes at a high frequency. Furthermore, in a case where a sidewalk itself is colorful (for example, in a case where a lattice shape, a pattern, or the like is drawn by tiles of two or more colors), the pixel values of the sidewalk change at a high frequency, and thus a difference is emphasized, which makes classification easier. As described above, a portion where a change in pixel value is small and a difference hardly occurs is extracted as black pixels, and a portion where a change in pixel value is large and a difference is emphasized is extracted as white pixels.

Figure 15:
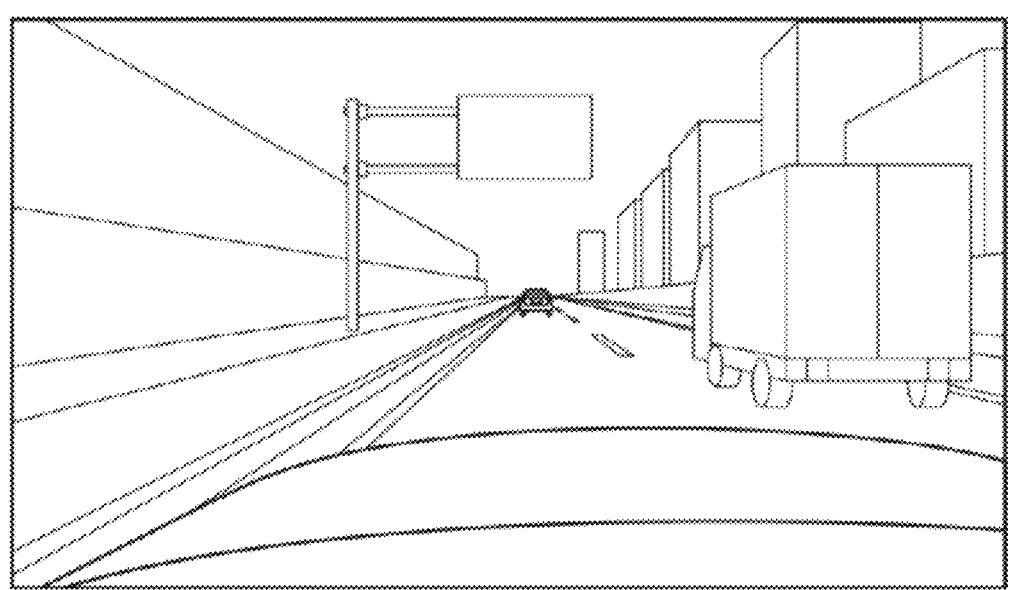
FIG. 15 is a diagram illustrating an example of correction to cut back pixels having a low frequency in consideration of the appearance frequency.
Figure 15:
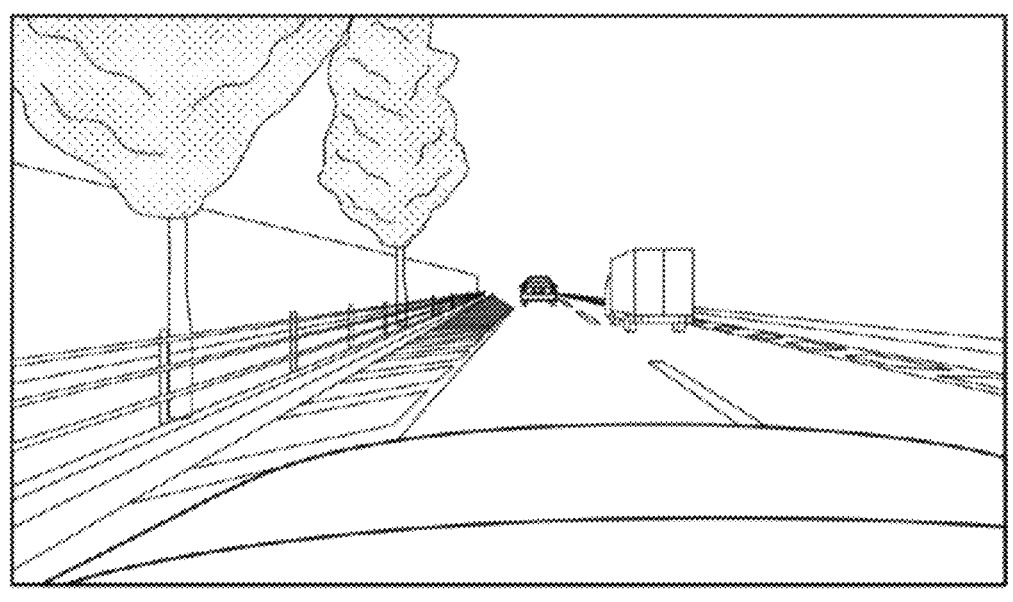

In the case of the upper image in FIG. 15, in a case where the colors of the roadway and the sidewalk are close and the color of the sidewalk is constant, the "sidewalk" portion has a small change in pixel value, and thus is extracted as black pixels. However, the color change at the boundary block between the roadway and the sidewalk makes it possible to determine the boundary line. In the case of the lower image in FIG. 15, there are features in the surrounding environment, the pixel values in the vicinity of the features change at a high frequency, and a difference is emphasized. Thus, the "sidewalk" portion is extracted as white pixels. The above is the description of the correction based on the appearance frequency.

Figure 16:
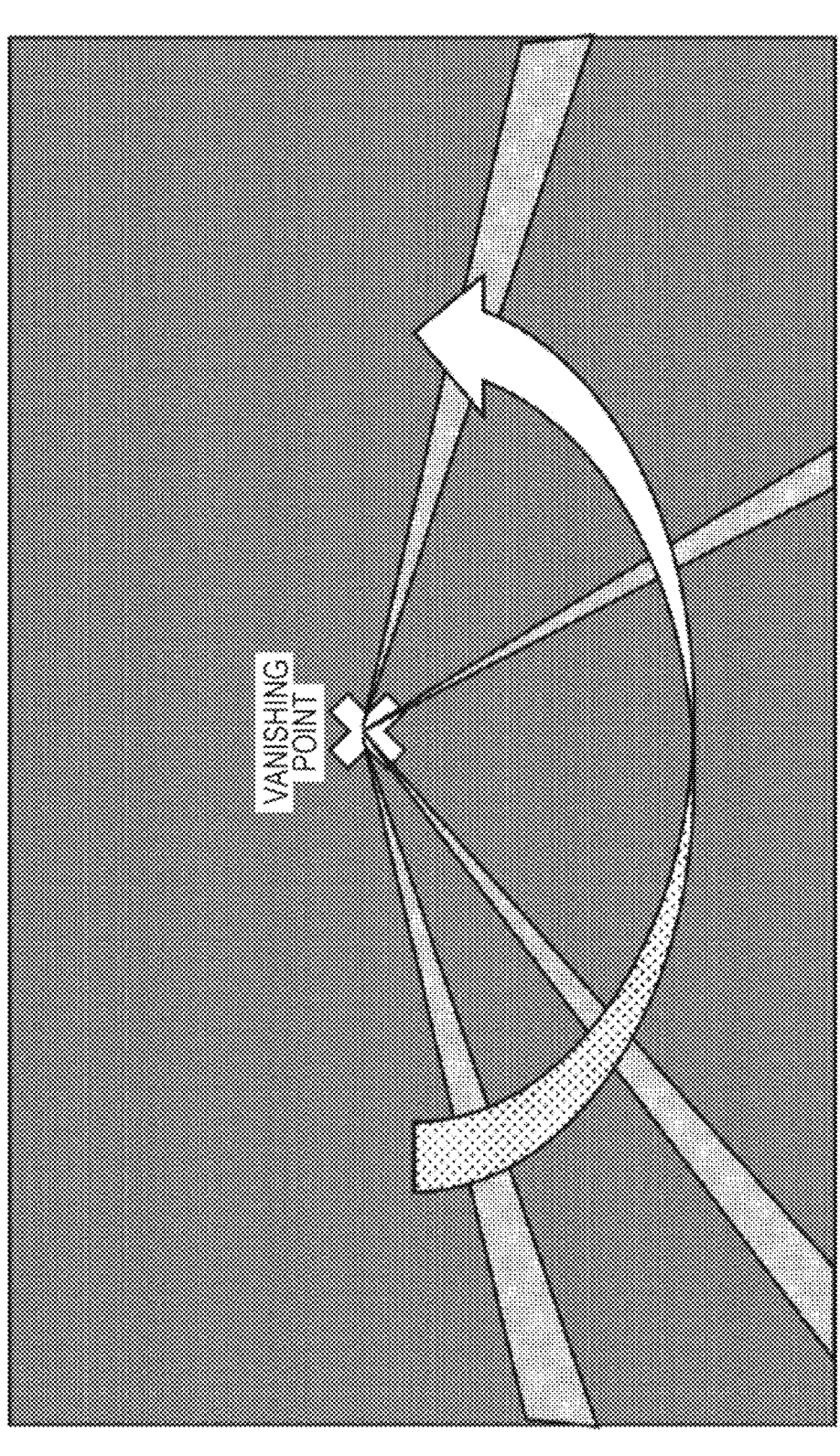
FIG. 16 is a diagram illustrating an example of correction to classify areas of a difference image from a vanishing point.

Furthermore, the shaping unit 122 may perform correction to classify areas of the difference image from a vanishing point. The difference image is divided into, for example, areas each expressed by a triangle from the vanishing point to the periphery, and the areas are classified into an area that has changed and an area that has not changed according to the ratio between black pixels and white pixels in each area. As illustrated in FIG. 16, if the installation position and the angle-of-view information of the camera (the angle-of-view information is fixed for each model and each internal setting) and the width of each lane of the road on which the vehicle is traveling are known, the position of a division line shown in an image can be roughly specified.

Figure 17:
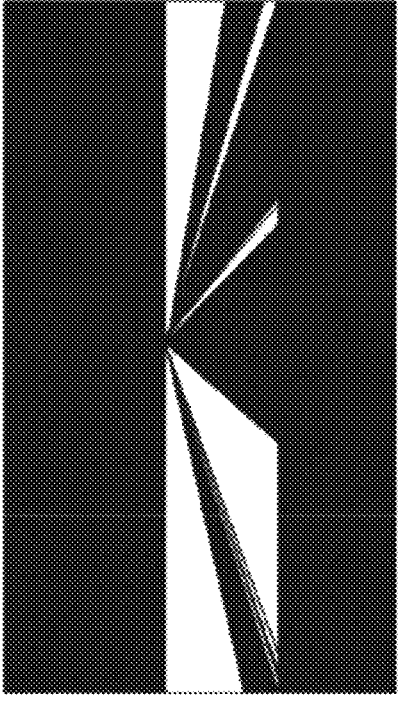
FIG. 17 is a diagram for removing an area of a difference image in which the subject vehicle is shown.
Figure 17:
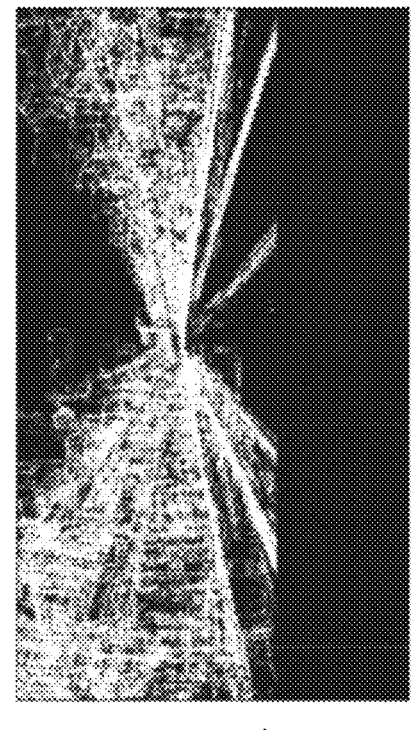

Furthermore, the shaping unit 122 may perform correction to remove an area of the difference image in which the subject vehicle is shown. As illustrated in FIG. 17, the lower area of the difference image is cut because there is a possibility that the subject vehicle may be shown. In this manner, the shaping unit 122 performs processing such that the area in which the vehicle itself is captured is not detected by the detection unit 112.

By the processing of the difference calculation unit 120 and the shaping unit 122 described above, in the difference image, an area having a large change amount is extracted in white, and an area having a small change amount is extracted in black.

The evaluation unit 124 specifies an area of a traveling lane of the subject vehicle and areas on the left and right sides of the traveling lane from the difference image corrected by the shaping unit 122, thereby classifying the areas and detecting a boundary. The evaluation unit 124 determines a threshold value for determining black and white in the classification of the areas. The areas of the corrected difference image are divided into a "black" area having a small change amount and a "white" area having a large change amount. The "white" area includes a line extracted as a division line. In the classification of the areas by the evaluation unit 124, for example, road information corresponding to the number of lanes of the roadway on which the vehicle is traveling is acquired from the road database 114, and the area having the small change amount is classified as a traveling lane of the subject vehicle and a peripheral traveling lane on the basis of the acquired road information and the extracted division line. The evaluation unit 124 then classifies the area having the small change amount as a roadway and the area having the large change amount as a portion other than the roadway.

Figure 18:
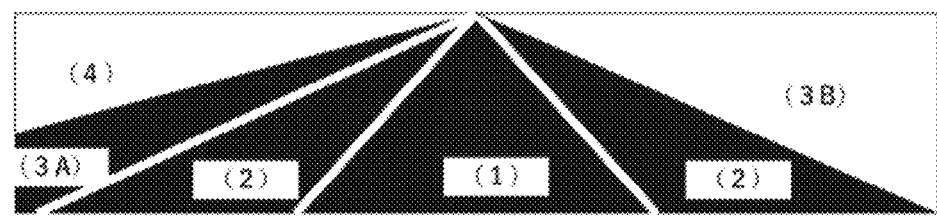
FIG. 18 is a diagram in which areas are specified and classified on the basis of a corrected difference image.
Figure 18:
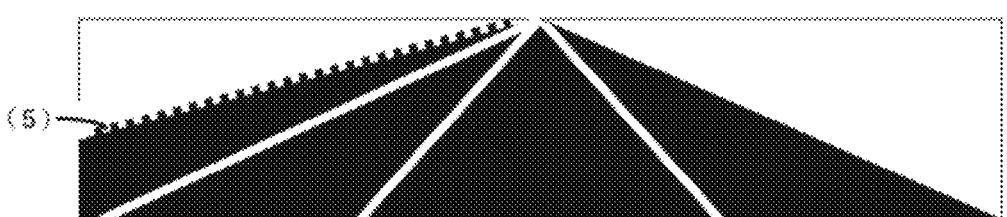

An example of detection in the evaluation unit 124 will be described below. FIG. 18 is a diagram in which areas are specified and classified on the basis of a corrected difference image. First, in the area (1), it is specified that the black area at the center of the image is a traveling lane of the subject vehicle. From the adjacent white division lines, it is specified that there are peripheral traveling lanes in the areas (2). From another adjacent white division line, it is specified that there is a traveling lane in the area (3A) and there is no traveling lane in the area (3B). Furthermore, it is specified that there is no traveling lane in the area (4) on the left side of (3A). According to the above specification, the areas are classified into a roadway, which is an area having a small change amount, and a portion other than the roadway, which is an area having a large change amount, and from the classification, the boundary (5) that divides the white and black areas is detected as a boundary between the roadway and a sidewalk. Furthermore, with reference to the number of traveling lanes existing on the left and right sides and the road information, it is possible to detect the subject vehicle traveling in the third lane on the basis of information that the road is a "road with four lanes on one side".

Examples of correction of the shaping unit 122 will be described with some patterns.

Figure 19:
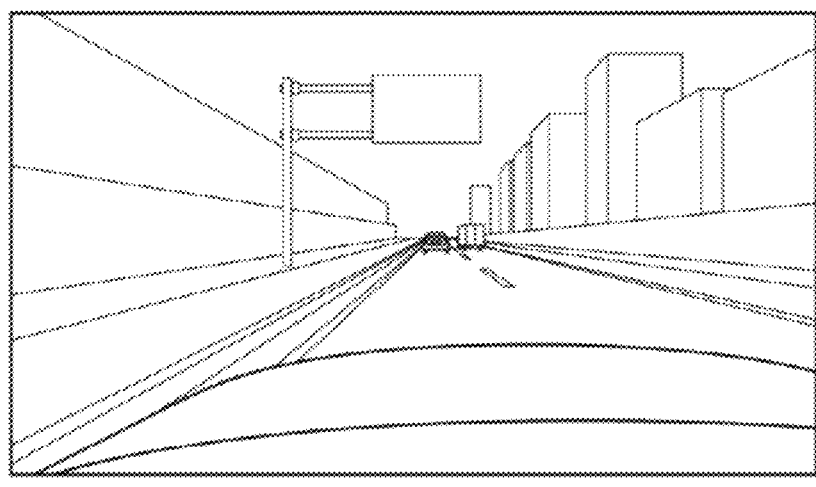
FIG. 19 illustrates an example of correction of a boundary between a roadway and a sidewalk when it is difficult to determine the boundary.
Figure 19:
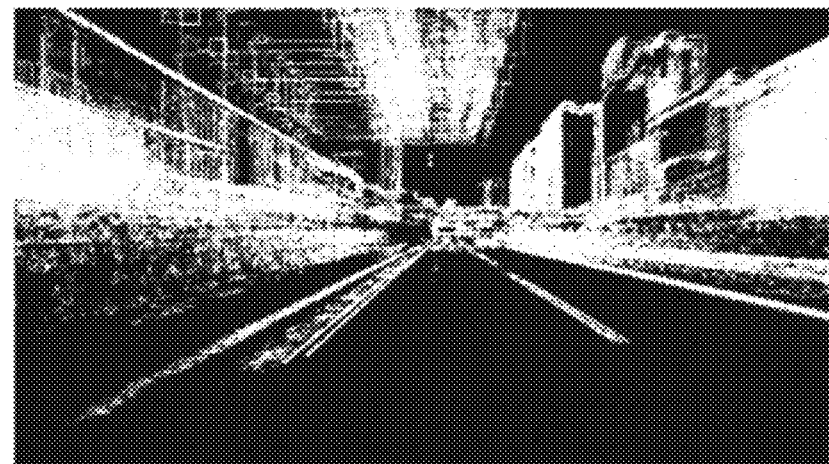
Figure 19:
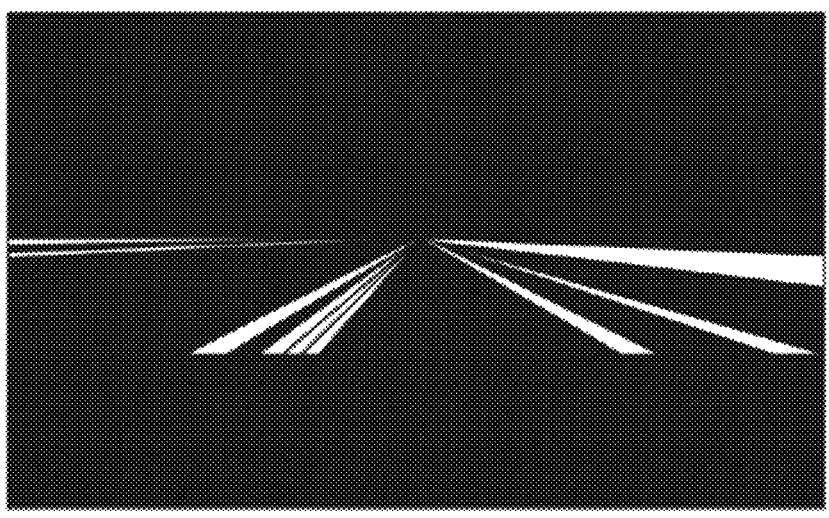

FIG. 19 illustrates an example of correction of a boundary between a roadway and a sidewalk when it is difficult to determine the boundary. In a case where only close colors appear continuously for a certain section of a sidewalk, the sidewalk may look like a roadway, but elements such as a road shoulder and a curbstone serve as a "white" area. Therefore, these elements are gathered and regarded as a "white" area in a certain range, and thus a portion of the "white" area in the certain range can be detected as a boundary.

Figure 20:
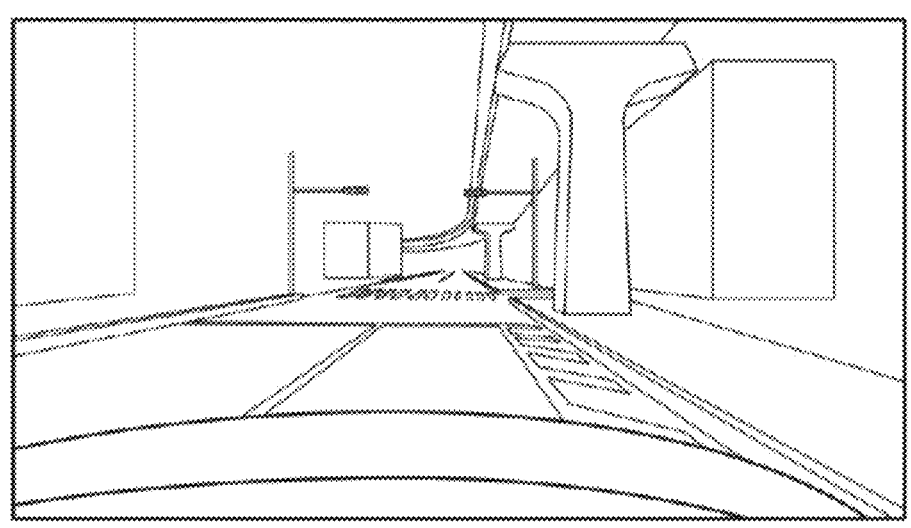
FIG. 20 illustrates an example of correction of a changeable area corresponding to a so-called zebra zone of a road.
Figure 20:
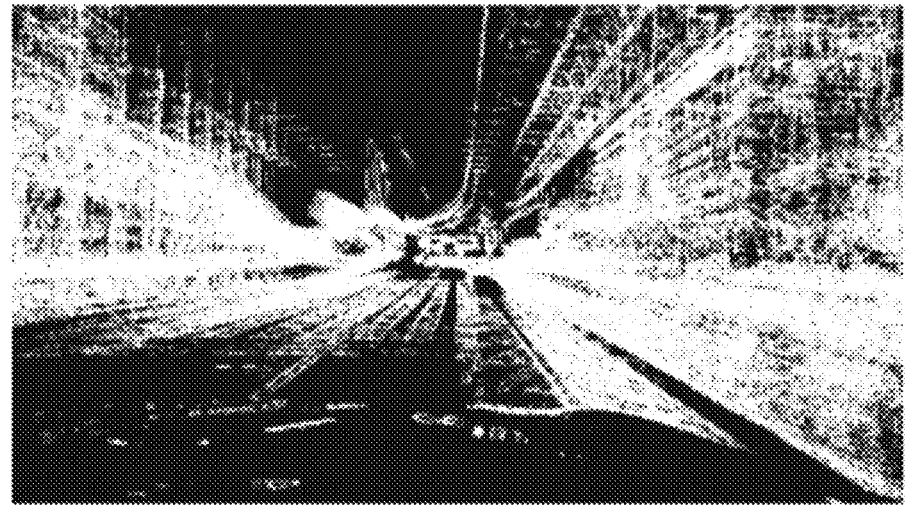
Figure 20:
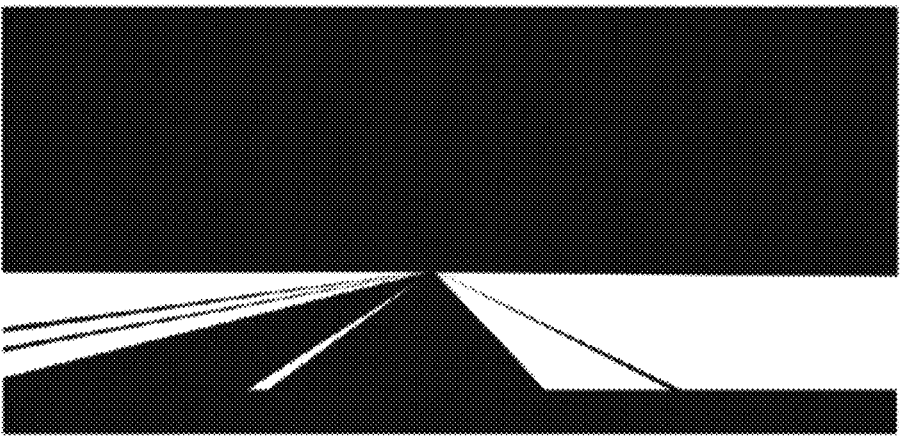

FIG. 20 illustrates an example of correction of a changeable area corresponding to a so-called zebra zone of a road. The shaping unit 122 can correct an area in which the zebra zone is continuous in a certain range as an area having a large change.

Figure 21:
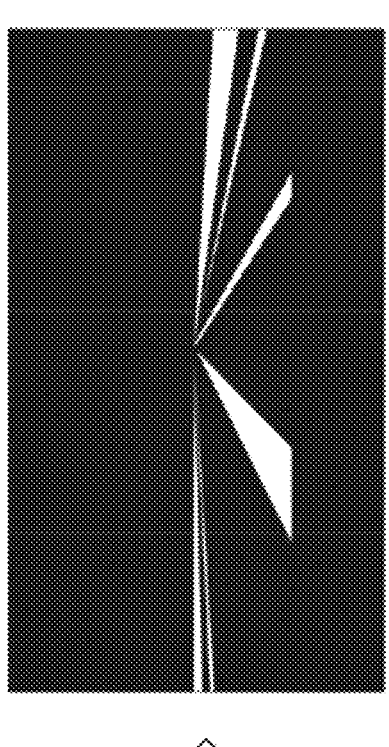
FIG. 21 is a diagram illustrating an example of correction according to the width of an area.
Figure 21:
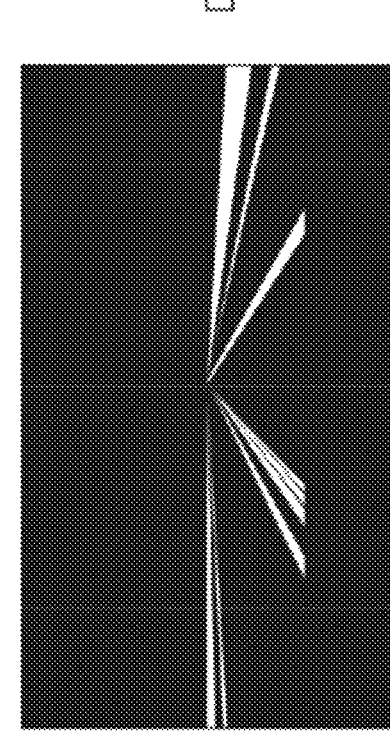

An example of correction according to the width of an area will be shown. In the case of the left side of FIG. 21, a narrow "black" area is regarded as "white", and is filled by correction of the shaping unit 122. In this manner, in a case where the width of a "black" area is narrower than a predetermined length, the shaping unit 122 corrects the "black" area to a "white" area.

Figure 22:
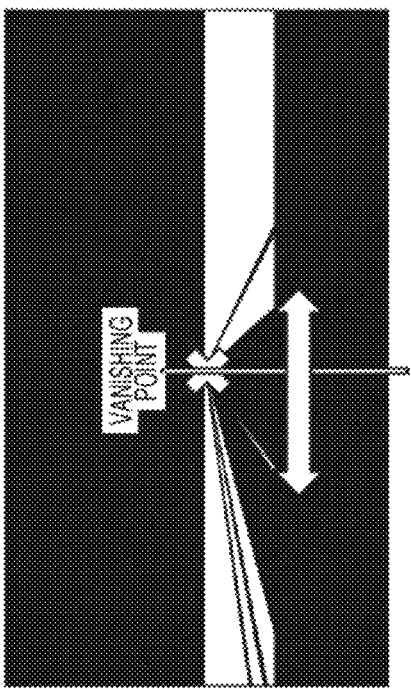
FIG. 22 is a diagram illustrating an example of classification of areas based on a vanishing point.
Figure 22:
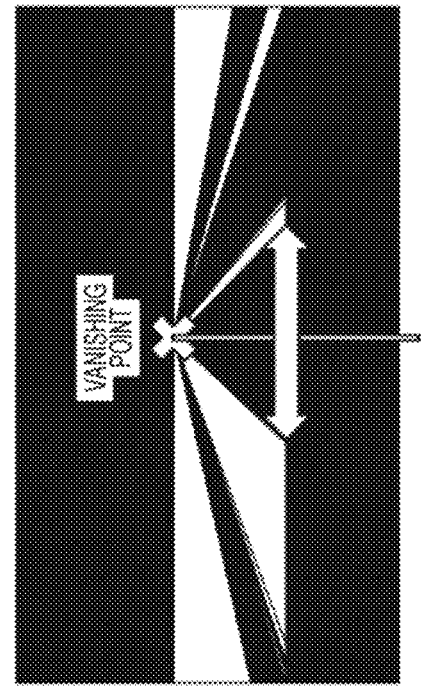

FIG. 22 illustrates an example of classification of areas based on a vanishing point. A "black" area immediately below the vanishing point is regarded as a traveling lane of the subject vehicle. If the width of a "white" area on the left side of the traveling lane is narrow, and there is a "black" area with a certain width or more on the left side of the narrow white area, it is determined that there is an adjacent traveling lane. Even in FIG. 22, a narrow "black" area is regarded as "white", and is filled by the correction of the shaping unit 122.

Figure 23:
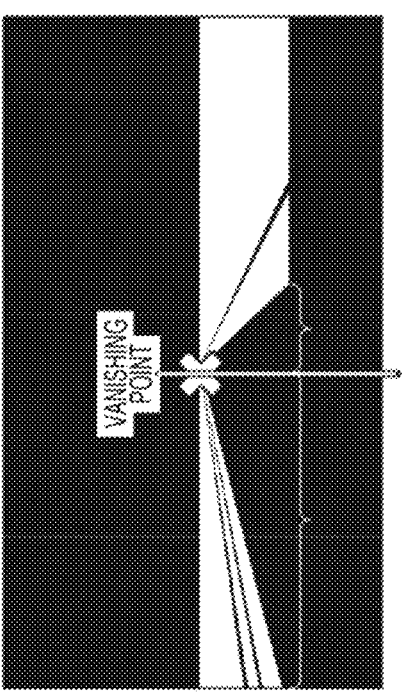
FIG. 23 is a diagram illustrating an example of correction of an area using a vanishing point.
Figure 23:
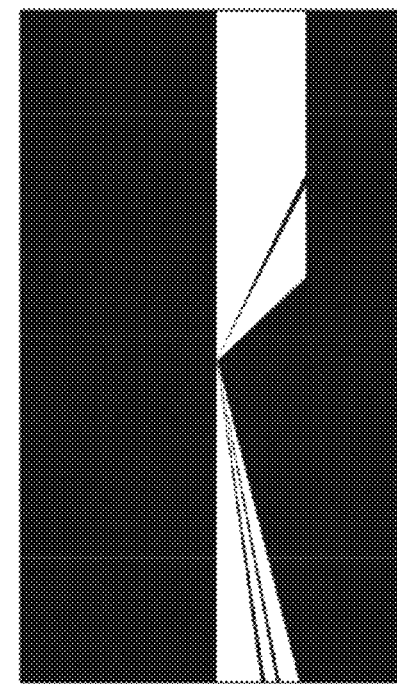

FIG. 23 illustrates correction of an area using a vanishing point. If a division line between traveling lanes cannot be recognized and a wide "black" area is assumed to be a traveling lane of the subject vehicle, the left/right ratio of the "black" area is obtained. In a case where there is an extreme difference in the left/right ratio, the black area is divided into two areas, and processing of sandwiching a "white" area between the two areas is performed.

Next, an operation of the recognition device 100 will be described.

Figure 24:
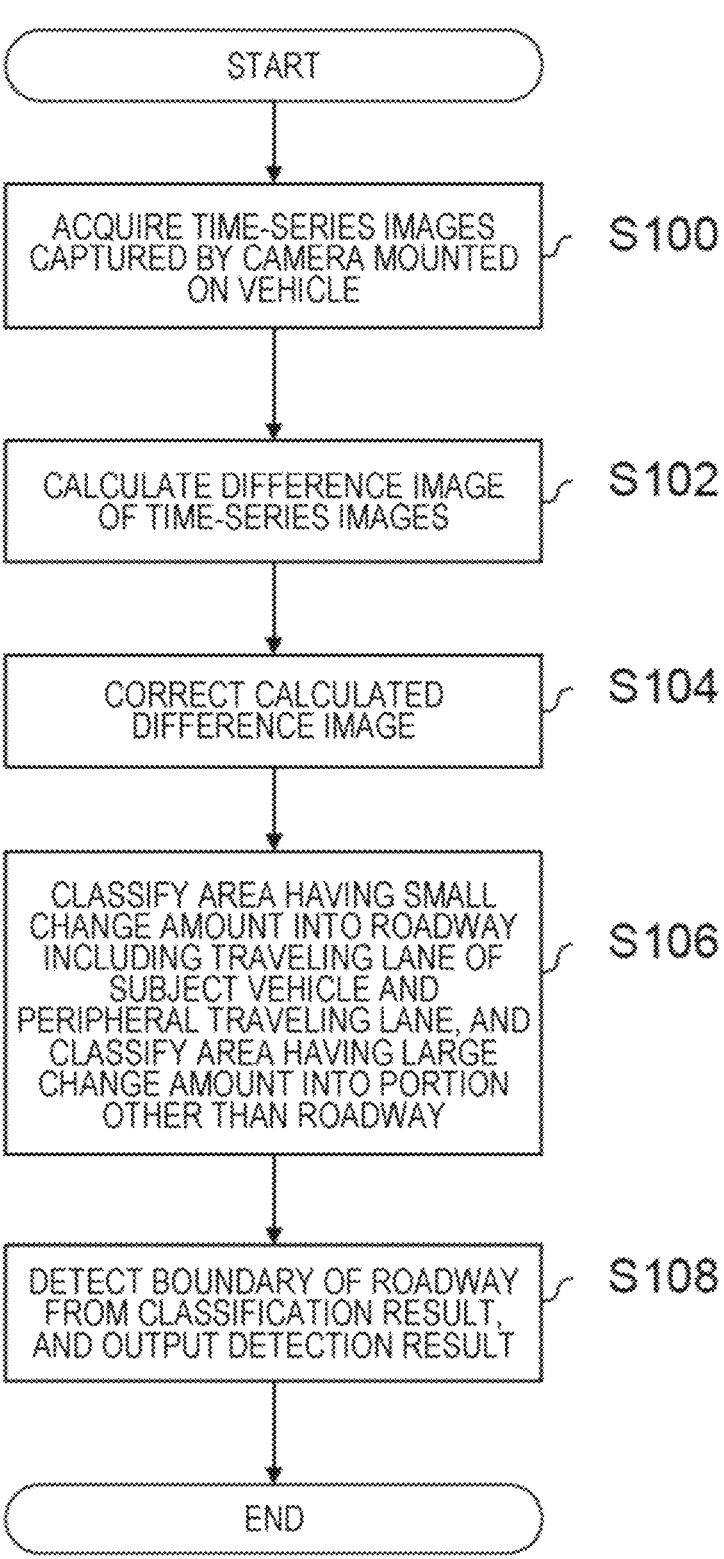
FIG. 24 is a flowchart illustrating a flow of recognition processing by the recognition device of the present disclosure.

FIG. 24 is a flowchart illustrating a flow of recognition processing by the recognition device 100 of the present disclosure. The recognition processing is performed by the CPU 11 reading the recognition program from the ROM 12 or the storage 14, developing the recognition program in the RAM 13, and executing the recognition program.

In step S100, the CPU 11 as the acquisition unit 110 acquires time-series images captured by a camera mounted on a vehicle.

In step S102, the CPU 11 as the difference calculation unit 120 calculates a difference image of the time-series images.

In step S104, the CPU 11 as the shaping unit 122 corrects the calculated difference image.

In step S106, the CPU 11 as the evaluation unit 124 classifies an area having a small change amount into a roadway including a traveling lane of the subject vehicle and a peripheral traveling lane, and classifies an area having a large change amount into a portion other than the roadway. The classification is performed on the basis of road information acquired from the road database 114 and a division line extracted from the corrected difference image. The acquired road information corresponds to the number of lanes of the roadway on which the vehicle is traveling.

In step S108, the CPU 11 as the evaluation unit 124 detects a boundary line between the traveling lanes and a boundary of the roadway representing a boundary line between the roadway and the portion other than the roadway from the classification result, and outputs the detection result.

As described above, according to the recognition device 100 of the present embodiment, it is possible to appropriately recognize the surrounding environment of the traveling vehicle.

Figure 25:
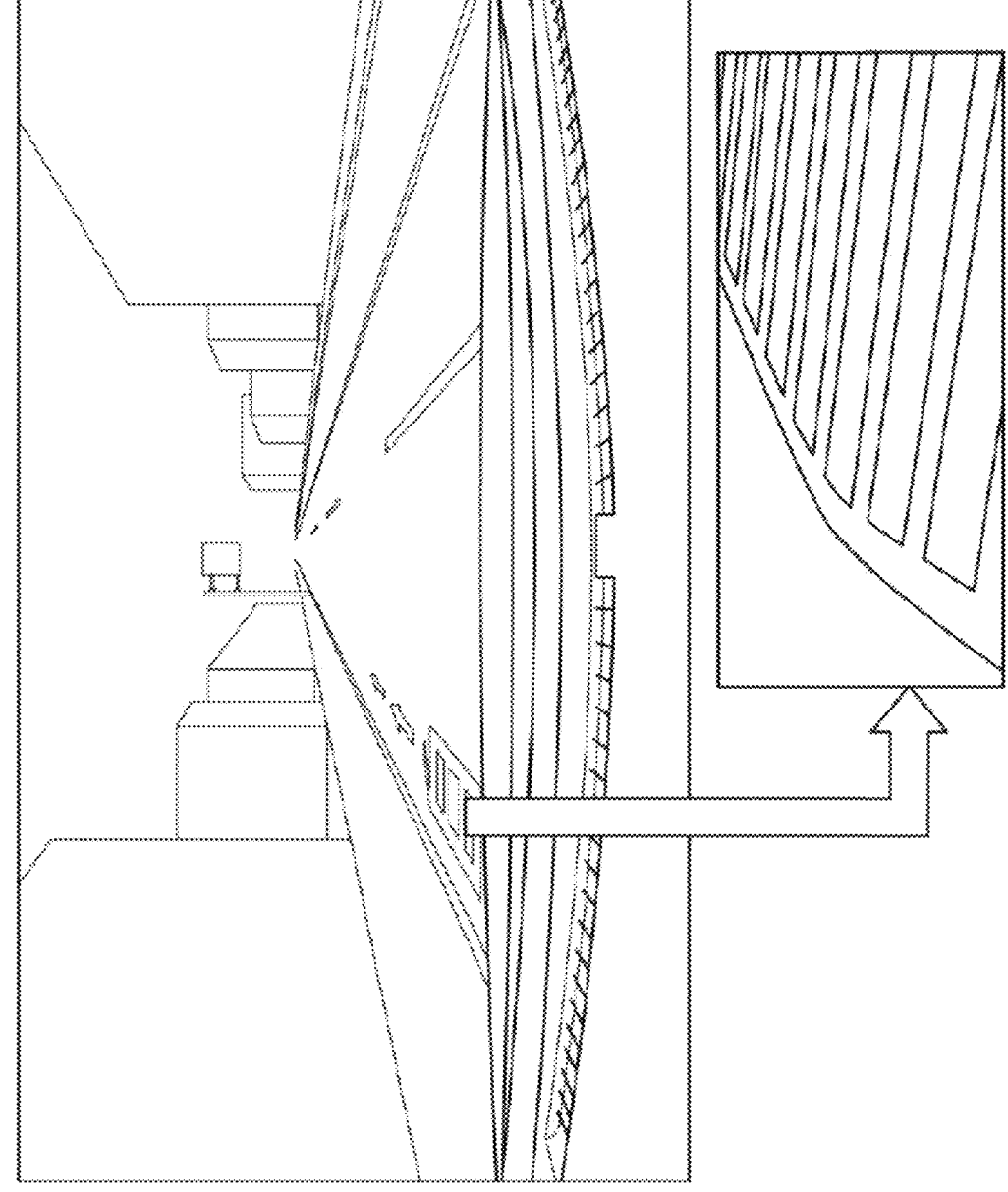
FIG. 25 is a diagram illustrating an example of a case where recognition of a surrounding environment according to the present technique is utilized for alert notification to a driver or in automatic driving.

A utilization example of the present technique will be described. FIG. 25 illustrates an example of a case where recognition of a surrounding environment according to the present technique is utilized for alert notification to a driver or in automatic driving. For example, in the situation of FIG. 25, if an automatically driven vehicle erroneously recognizes that "both left and right sides are broken lines", determines that the vehicle is traveling in the second lane, and changes the lane to the left, there is a possibility that the vehicle may get on a sidewalk. The left side is not a broken line but is actually a bicycle traveling zone. Such a problem does not occur if recognition of a surrounding environment according to the present technique shows that a boundary of the roadway is on the immediate left side of the traveling lane of the subject vehicle. In addition, if it is found that the bicycle traveling zone is present between the division line and the road boundary line, an alert can be issued when the driver tries to park the vehicle on the road.

Figure 26:
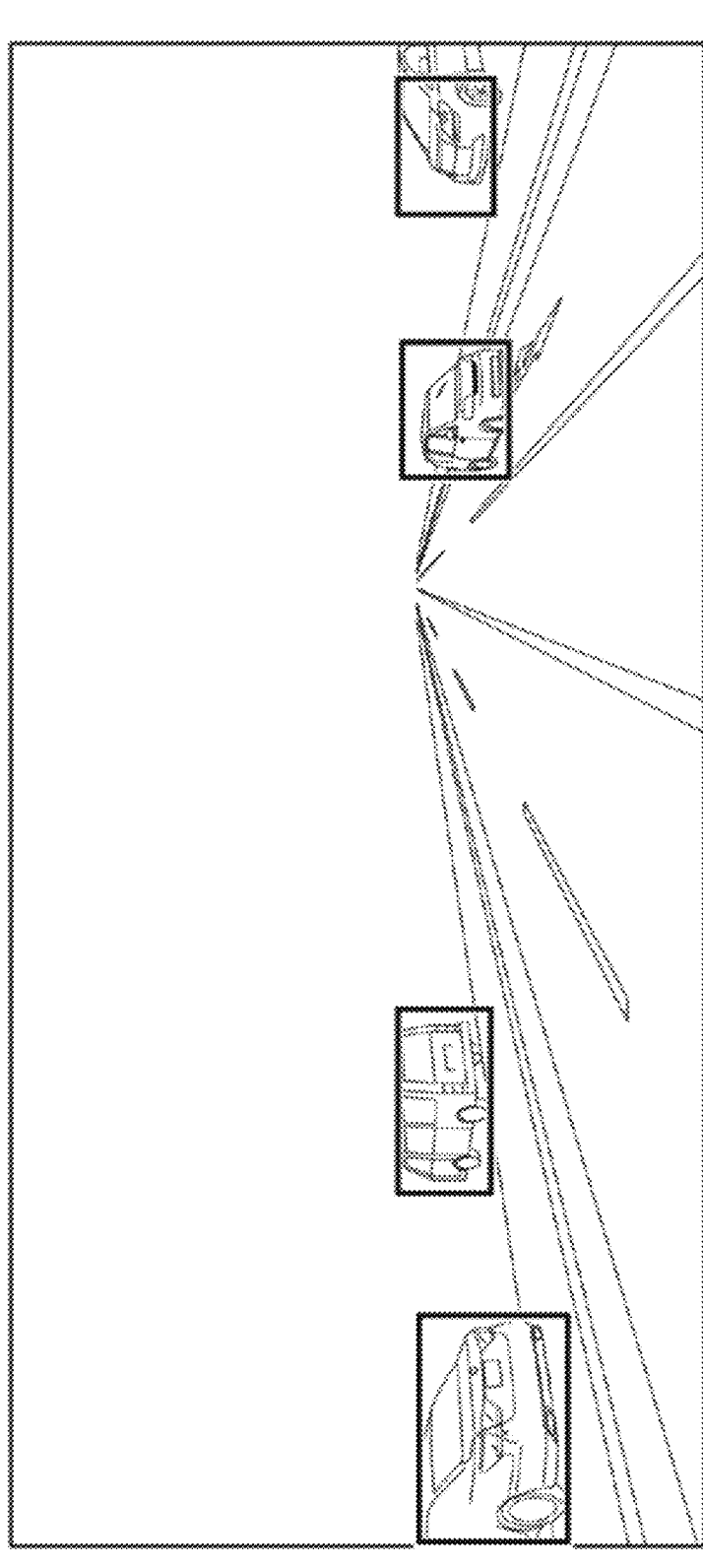
FIG. 26 is a diagram illustrating an example of a case where recognition of a surrounding environment according to the present technique is utilized for object detection.

FIG. 26 illustrates an example of a case where recognition of a surrounding environment according to the present technique is utilized for object detection. For example, in a case where vehicles are detected as objects, a vehicle on a roadway and a vehicle in a site (such as a parking lot) may be simultaneously shown. Even in a case where no division line is present at an edge of the road or a division line cannot be seen due to peel-off, it is possible to determine whether or not the vehicles are on the roadway and classify the vehicles if a boundary between the roadway and a sidewalk can be detected.

Modification

Figure 27:
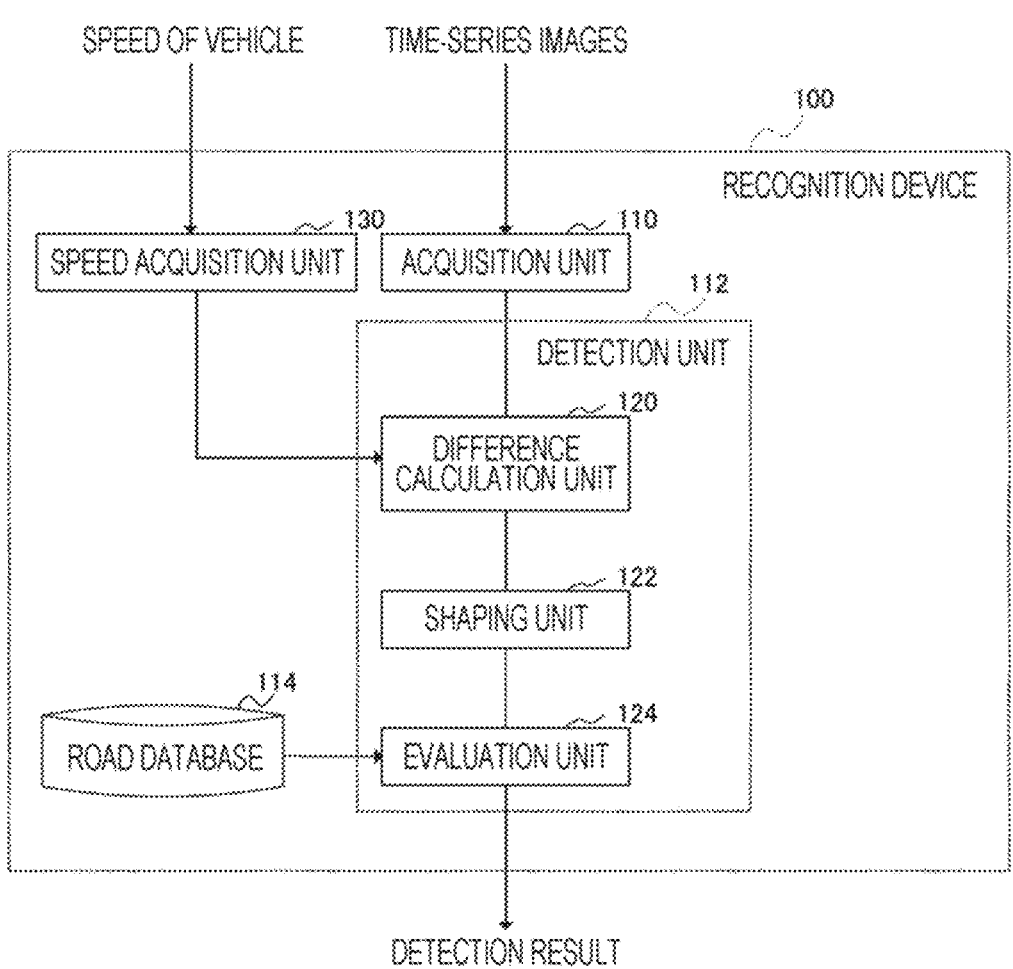
FIG. 27 illustrates a configuration example of a recognition device in a modification of the present disclosure.

As a modification of the above embodiment, a speed acquisition unit 130 that acquires the speed of a vehicle may be provided as illustrated in FIG. 27, and the difference calculation unit 120 of the detection unit 112 may calculate a difference image so as to use only images captured when the speed has a value equal to or larger than a predetermined threshold value. The reason why the images are selected according to the speed as described above is because an important point of the present technique is capturing the fact that "a background is moving" due to traveling of a vehicle to be observed. For example, using information on the speed of the vehicle, the difference calculation unit 120 performs processing of calculating a difference image using only images in a case where the vehicle is traveling at a speed of 20 km/h or more.

In addition, an example of application to other than a roadway will be described. For example, application to a case of a train and a railroad makes it possible to detect rails. The rails always appear in a constant color (that is, black) except for the influence of shadows. Between the rails, ties and ballast (gravel) are alternately installed, and thus a change is emphasized. Similarly, ballast outside the rails is not in a constant color, and thus a change is emphasized. That is, both the ties and the ballast can be detected as "white" areas.

As for application to a running robot, it is assumed that the robot runs on a sidewalk, and the robot is controlled so as not to protrude from a road having a constant color, whereby time-series images usable in the present technique can be obtained.

Note that the recognition processing executed by the CPU reading software (program) in the above embodiment may be executed by various processors other than the CPU. Examples of the processors in this case include a programmable logic device (PLD) whose circuit configuration can be changed after manufacturing, such as a field-programmable gate array (FPGA), and a dedicated electric circuit that is a processor having a circuit configuration exclusively designed for executing specific processing, such as an application specific integrated circuit (ASIC). In addition, the recognition processing may be executed by one of these various processors, or may be executed by a combination of two or more processors of the same type or different types (for example, a plurality of FPGAs, a combination of a CPU and an FPGA, or the like). Furthermore, a hardware structure of the various processors is, more specifically, an electric circuit in which circuit elements such as semiconductor elements are combined.

In the above embodiment, the aspect in which the recognition program is stored (installed) in advance in the storage 14 has been described, but the present technique is not limited thereto. The program may be provided by being stored in a non-transitory storage medium such as a compact disk read only memory (CD-ROM), a digital versatile disk read only memory (DVD-ROM), and a universal serial bus (USB) memory. In addition, the program may be downloaded from an external device via a network.

Regarding the above embodiment, the following supplements are further disclosed.

Supplement 1

A Recognition Device Including:
  a memory; and
  at least one processor connected to the memory, in which the processor
  is a recognition device that detects a boundary of a
    roadway by use of time-series images captured by a
    camera mounted on a vehicle, and
  is configured to
  acquire the time-series images, and
  classify areas in the acquired time-series images into a
    roadway, which is an area having a small change
    amount, and a portion other than the roadway, which is
    an area having a large change amount, according to
    magnitude of the change amounts, and detect a boundary between the area having the small change amount
    and the area having the large change amount as a
    boundary of the roadway.

Supplement 2

A non-transitory storage medium storing a program that can cause a computer to execute recognition processing of detecting a boundary of a roadway by use of time-series images captured by a camera mounted on a vehicle, the recognition processing including:
  acquiring the time-series images; and
  classifying areas in the acquired time-series images into a
    roadway, which is an area having a small change
    amount, and a portion other than the roadway, which is
    an area having a large change amount, according to
    magnitude of the change amounts, and detecting a
    boundary between the area having the small change
    amount and the area having the large change amount as
    a boundary of the roadway.

REFERENCE SIGNS LIST

100 Recognition Device
110 Acquisition Unit
112 Detection Unit
114 Road Database
120 Difference Calculation Unit
122 Shaping Unit
124 Evaluation Unit
130 Speed acquisition unit

The invention claimed is:

1. A recognition device that detects a boundary of a roadway by use of time-series images captured by a camera mounted on a vehicle, the recognition device comprising:

a memory, and
at least one processor coupled to the memory, the at least
  one processor being configured to:
  acquire the time-series images;
  generate a plurality of images in which changes
    between the time-series images are emphasized by
    using the acquired time-series images;
  calculate a difference image by superimposing the
    plurality of images in which the changes are emphasized;
  calculate change amounts of areas based on changes in
    pixels of the difference image; and
  clarify areas in the acquired time-series images into a
    roadway, which is an area having a small change
    amount, and a portion other than the roadway, which
    is an area having a large change amount, according
    to magnitude of the change amounts, and detect a
    boundary between the area having the small change
    amount and the area having the large change amount
    as a boundary of the roadway.

2. The recognition device according to claim 1, wherein the processor is configured to further perform correction to remove an area in which the vehicle itself is captured is not detected from the time-series images.

3. The recognition device according to claim 1, wherein the processor is configured to
  acquire a speed of the vehicle, and
  use only an image captured when the speed has a value
    equal to or larger than a predetermined threshold value.

4. The recognition device according to claim 1, wherein the processor is configured to correct one of binarized areas to another of the binarized areas in a case where a width of one of binarized areas of the difference image is narrower than a predetermined length.

5. The recognition device according to claim 1, wherein the processor is configured to acquire road information corresponding to the number of lanes of the roadway on which the vehicle is traveling, and specify a traveling lane of the vehicle and a peripheral traveling lane as the area having the small change amount on a basis of the road information and a division line extracted in the time-series images.

6. A recognition method for causing a computer that detects a boundary of a roadway by use of time-series images captured by a camera mounted on a vehicle to execute processing comprising:
  acquiring the time-series images;
  generating a plurality of images in which changes
    between the time-series images are emphasized by
    using the acquired time-series images;
  calculating a difference image by superimposing the plurality of images in which the changes are emphasized;
  calculating change amounts of areas based on changes in
    pixels of the difference image; and
  classifying areas in the acquired time-series images into a
    roadway, which is an area having a small change
    amount, and a portion other than the roadway, which is
    an area having a large change amount, according to
    magnitude of the change amounts, and detecting a
    boundary between the area having the small change
    amount and the area having the large change amount as
    a boundary of the roadway.

7. A non-transitory, computer-readable storage medium storing a recognition program for causing a computer that detects a boundary of a roadway by use of time-series images captured by a camera mounted on a vehicle to execute processing comprising:

acquiring the time-series images;

generating a plurality of images in which changes between the time-series images are emphasized by using the acquired time-series images;

calculating a difference image by superimposing the plurality of images in which the changes are emphasized;

calculating change amounts of areas based on changes in pixels of the difference image; and classifying areas in the acquired time-series images into a roadway, which is an area having a small change amount, and a portion other than the roadway, which is an area having a large change amount, according to magnitude of the change amounts, and detecting a boundary between the area having the small change amount and the area having the large change amount as a boundary of the roadway.

* * * * *